United States Patent
Fleischer, III et al.

(10) Patent No.: US 6,542,598 B2
(45) Date of Patent: *Apr. 1, 2003

(54) ADVANCED INTELLIGENT SIGNAL TELEPHONE NUMBER ROUTING

(75) Inventors: Harold C. Fleischer, III, St. Louis, MO (US); Gwen H. Gaffney, St. Louis, MO (US); Susan D. Eiffert, St. Louis, MO (US); James C. Merlotti, St. Louis, MO (US); Michael W. Boeckman, St. Louis, MO (US); Brenda S. Thompson, Austin, TX (US)

(73) Assignee: SEC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,292

(22) Filed: Oct. 15, 2001

(65) Prior Publication Data

US 2002/0057781 A1 May 16, 2002

Related U.S. Application Data

(63) Continuation of application No. 09/567,431, filed on May 10, 2000, which is a continuation of application No. 08/608,400, filed on Feb. 28, 1996, now Pat. No. 6,097,802.

(51) Int. Cl.[7] .......................... H04M 3/54; H04M 7/00; H04M 15/00
(52) U.S. Cl. .............................. 379/211.02; 379/112.01; 379/127.01; 379/207.15; 379/221.09; 379/221.12; 379/207.03; 379/207.12
(58) Field of Search ....................... 379/207.02, 207.03, 379/207.12, 211.02, 221.01, 230, 111, 112.01, 127.01, 201.01, 207.15, 220.01, 221.08, 221.09, 221.12

(56) References Cited

U.S. PATENT DOCUMENTS

| 5,506,897 A | 4/1996 | Moore et al. ........... 379/220.01 |
| 5,533,107 A | 7/1996 | Irwin et al. ............. 379/201.01 |
| 5,588,048 A | 12/1996 | Neville ................... 379/127.01 |
| 5,592,541 A | 1/1997 | Fleischer, III et al. .. 379/211.02 |
| 5,610,977 A | 3/1997 | Williams et al. ........ 379/221.13 |
| 5,799,073 A | 8/1998 | Fleischer, III et al. .. 379/112.01 |
| 5,805,688 A | 9/1998 | Gillespie et al. ........ 379/221.08 |
| 5,901,214 A | 5/1999 | Shaffer et al. .......... 379/211.02 |
| 6,097,802 A * | 8/2000 | Fleischer et al. ....... 379/211.02 |
| 6,411,699 B1 * | 6/2002 | Fleischer et al. ....... 379/211.02 |

* cited by examiner

*Primary Examiner*—Harry S. Hong
(74) *Attorney, Agent, or Firm*—Greenblum & Bernstein, P.L.C.

(57) ABSTRACT

An apparatus and method are provided for routing a telephone call according to the geographic location of the originating party. A subscriber with multiple network locations within a service territory-may have all of their offices accessible to customers through a single publicized telephone number. The single telephone number may trigger advanced intelligent network technology. The network may ascertain the geographic location from which the call originates and accordingly, route the originating call to a subscriber's office which is located closest to the originating caller. Further, exception periods may be provided to enable subscribers to individualize their service by only routing to the closest satellite office at specified days, times, etc. The exception periods may also be employed to reroute calls intended for the closest satellite office to a predetermined location.

20 Claims, 15 Drawing Sheets

| Zip Code | Routing Number |
|---|---|
| 63101-1234 | (314) 380-8500 |
| 63101-124 | (314) 380-8501 |
| 63101-125 | (314) 380-8500 |
| 63101-13 | (314) 380-8502 |
| 63101-22 | (314) 364-4677 |
| 63101-20 | (314) 364-4677 |
| 63102-156 | (810) 360-4602 |
| 63102-155 | (810) 360-4603 |

Figure 3

| Included NPA-NXX |
|---|
| 314 350 |
| 314 360 |
| 314 370 |
| 314 380 |

Figure 4

| NPA-NXX | Company Id |
|---------|------------|
| 314 350 | 0 |
| 314 360 | 100 |
| 314 370 | 0 |
| 314 380 | 200 |

Figure 6

| NPA-NXX | LATA | STATE |
|---|---|---|
| 210 | 123 | TX |
| 210 202 | 125 | TX |
| 210 233 | 125 | TX |
| 210 245 | 125 | TX |
| 210 248 | 125 | TX |
| 210 262 | 125 | TX |
| 210 268 | 125 | TX |
| 210 273 | 125 | TX |
| 210 279 | 125 | TX |
| 210 298 | 125 | TX |

Figure 8

ADVANCED INTELLIGENT SIGNAL TELEPHONE NUMBER ROUTING

This is a continuation of U.S. Pat. application Ser. No. 09/567,431, filed May 10, 2000, which is a continuation of U.S. Pat. application Ser. No. 08/608,400, filed Feb. 28, 1996, now U.S. Pat. No. 6,097,802, issued on Aug. 1, 2000, the contents of which are expressly incorporated by reference herein in their entireties.

BACKGROUND OF THE INVENTION

1. Field of the Invention

The present invention generally relates to an apparatus and method for routing telephone calls in a telecommunications network according to the geographic location from which the call originates. More particularly, the present invention relates to an application in an Advanced Intelligent Network (AIN) for routing calls to a closest of a plurality of branch or satellite offices based upon the geographic area in which the call originates, e.g., according to the zip code+4 of the caller.

2. Acronyms

The written description provided herein contains acronyms which refer to various communication services and system components. Although known, use of several of these acronyms is not strictly standardized in the art. For purposes of the written description herein, acronyms will be defined as follows:

AIN—Advanced Intelligent Network
CCS—Common Channel Signaling
CENTREX—Central Exchange Service
CIC—Carrier Identification Code
CO—Central Office
CPR—Call Processing Record
DID—Direct Inward Dialing
DRS—Data Reporting System
ILEC—Independent Local Exchange Carrier
ISCP—Integrated Service Control Point
IXC—Interexchange Carrier
LATA—Local Access and Transport Area
LIDB—Line Information Data Base
LVAS—Line Validation Administration System
NPA—Number Plan Area
NXX—Central Office Code
PBX—Private Branch Exchange
PIC—Presubscribed Interexchange Carrier
SCP—Service Control Point
SS7—Signaling System 7
SSP—Service Switching Point
STP—Signaling Transfer Point
TCAP—Transaction Capabilities Applications Part
TCP/IP—Transmission Control Protocol/Internet Protocol
WAN—Wide Area Network

BACKGROUND AND MATERIAL INFORMATION

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN architecture is shown in FIG. 15. As shown in FIG. 15, Central Offices (CO) 64–70 are provided for sending and receiving data messages from a Service Control Point (SCP) 56 via a Signaling Transfer Point (STP) 58–62. The data messages are communicated to and from the COs 64–70 and the SCP 56 along a Common Channel Signaling (CCS) network 88. Each CO 64–70 serves as a network Service Switching Point (SSP) to route telephone calls between a calling station (e.g., station 72) and a called station (e.g., station 84) through the trunked communications network 90–92. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of features provided by prior AIN or AIN-type intelligent networks relate to specialized call processing of incoming calls.

For example, U.S. Pat. Nos. 4,611,094 and 4,611,096, both to ASMUTH et al., disclose a system for providing custom incoming telephone call processing services to a subscriber operating at many geographically diverse locations. A subscriber program stored in a central database is accessed to provide instructions to the SSPs to complete incoming calls to one of the subscriber locations in accordance with special services defined by the subscriber. The subscriber program controls the Action Control Points (ACP) to string together the desired call processing capabilities to process each call. Specified parameters stored in the program, such as time of day, caller location and data inputted by the caller, determine the final destination to which each call should be completed.

U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located at a centralized location, such as an SCP. Service features are controlled by the central database and are changed by reprogramming the service logic located at the central database. A variety of service features are provided including a work at home service that enables a user of a private network access from a home telephone and access authorization to increase the security of the private network.

U.S. Pat. No. 5,353,331, to EMERY et al., discloses an AIN system which connects to, and controls processing of, calls to a subscriber's wireless handset via a home base station or wireless communication network. In response to calls directed to the subscriber's wireless handset, the AIN determines where the handset is located using a central database and routes the call to that location. The incoming call can be routed directly to the handset, blocked, or routed to an alternate termination point. In response to calls from the handset, the central database provides instruction data to the land line network to extend a requested special service to the subscriber.

While prior AIN or AIN-type intelligent network applications have provided various call forwarding features to subscribers and users, such prior attempts have not automatically ascertained the geographic location of the call origination so as to route the call to a nearest termination telephone number as more fully described herein. Further, such prior attempts have not provided flexibility to subscribers in terms of providing various routing options that may be combined with routing based on geographic location of the call.

These features would be highly desirable to users or subscribers, i.e., businesses with many satellite offices within a single geographic area so that customers, by calling a single publicized telephone number, will automatically be routed to the closest office location of the subscriber. The ability to combine geographic routing with other routing options (time-of-day, day-of-week, specific date, percent allocation distribution, etc.) would also be beneficial to businesses by providing proper and automatic routing of calls from customers. Further, by using a single publicized telephone number, up-front investment costs of the subscriber's premises equipment and advertising costs are reduced, customer's efforts to contact a convenient location of the subscriber are aided, and fast reliable service to subscribers and their customers is provided.

SUMMARY OF THE PRESENT INVENTION

In view of the above, the present invention, through one or more of its various aspects and/or embodiments is thus presented to accomplish one or more objectives and advantages, such as those noted below.

A general object of the present invention is to provide an apparatus and method for routing calls based upon the geographic location from which the call originates.

Another object of the present invention is to provide Advanced Intelligent Network (AIN) functionality to a subscriber with multiple branch or satellite business locations within a local telephone service network.

A further object of the present invention is to provide Advanced Intelligent Network (AIN) functionality and routing for a single publicized telephone number.

Still another object of the present invention is to route calls to a nearest branch office according to the geographic location of the calls origination, e.g., by using zip code+4.

Another object of the present invention is to incorporate a single telephone number service with other intelligent call forwarding services to route calls to a nearest satellite office-according to a business subscriber's needs, e.g., the nearest branch open for business.

Accordingly, one aspect of the present invention is directed to a method for routing an originating call to a subscriber location within a communication network. The network includes a two-way communication network interconnecting a plurality of service switching points and a plurality of dispersed network locations. The service switching points selectively establishing a communication connection between at least two of the network locations in response to a call request from a calling party, and a service control point includes a subscriber service logic. The network locations include a plurality of subscriber locations. The method includes identifying a subscriber's service based on the call request from the calling party to establish a communication connection with the subscriber, ascertaining a geographic location of the originating call in accordance with the originating telephone number of the calling party, determining which of the plurality of subscriber locations is closest to the geographic location of the calling party, and routing the originating call to the determined closest subscriber location.

According to another aspect of the present invention, the ascertaining step includes receiving the originating telephone number and translating the originating telephone number into a zip code of call origination.

According to yet another aspect of the present invention, the ascertaining step includes forwarding the call request to a predetermined default telephone number when the originating telephone number is not received by the service control point.

According to a further aspect of the present invention, the method further includes limiting incoming calls to the identified service to calls originating within a predefined geographic area. The limiting step may occur after identifying the service and before the ascertaining step.

According to yet another aspect of the present invention, the predefined geographic area defines a market area of the subscriber and stored in a table in the service control point.

According to another aspect of the present invention, the method further includes forwarding calls originating outside of the predefined geographic area to an informational announcement.

According to another aspect of the present invention, the determining step includes comparing the ascertained geographic location with a predefined list of subscriber service areas. The predefined list may be stored within the service control point.

According to yet another aspect of the present invention, the predefined list correlates each geographic location within the subscriber service area with a predefined terminating number of one of the plurality of subscriber locations.

According to yet another aspect of the present invention, the ascertaining step includes querying an external database that includes a list of service provider customer telephone numbers and corresponding customer geographic information. The customer information may include zip code+4 information.

According to another aspect of the present invention, the method further includes responding to the querying step by transmitting the geographic information related to the originating telephone number to the service control point. The determining step forwards the call request to a terminating telephone number of the closest subscriber location to the geographic location response.

According to another aspect of the present invention, the method further includes responding to the querying step by transmitting predetermined default geographic information when the originating telephone number is not listed in the external database. The determining step forwards the call request to a predetermined default telephone number when predetermined default geographic information is transmitted in the query response.

According to yet another aspect of the present invention, the ascertaining step further includes waiting a predetermined time period for a response to the query to the external database and forwarding the call request to a predetermined default routing telephone number if a response is not received within the predetermined period. The predetermined time period being between approximately 1.0 and 3.0 seconds.

According to a further aspect of the present invention, the predefined list includes a plurality of geographic areas which comprise a predefined subscriber service area. Each geographic area listed is associated with a routing telephone number corresponding to one of the plurality of subscriber locations. The determining step includes comparing the ascertained geographic location with each geographic area listed in the predefined list. If one of the plurality of geographic areas corresponds to the ascertained geographic location, the method forwards the call request to the associated routing telephone number, and if one of the plurality of geographic areas does not correspond to the ascertained geographic location, the method forwards the call request to a predetermined default routing telephone number.

According to a further aspect of the present invention, each geographic area is listed according to it post office zip code+4 designation. The comparing steps include comparing the ascertained geographic location to the zip code+4 designation of each listed geographic area. If no matches are found, comparing the ascertained geographic location to the zip code+3 designation of each listed geographic area, wherein if no matches are found, comparing the ascertained geographic location to the zip code+2 designation of each listed geographic area, wherein if no matches are found, comparing the ascertained geographic location to the zip code +1 designation of each listed geographic area, wherein if no matches are found, comparing the ascertained geographic location to the zip code+0 designation of each listed geographic area, and wherein if no matches are found, the call request is forwarded to a predetermined default routing telephone number.

According to another aspect of the present invention, each geographic area may be listed only according to its zip code+2 and zip code+1 designation.

According to yet another aspect of the present invention, the external database includes a line information database. The line information database includes receiving service provider customer billing information for each associated customer telephone number, stripping off post office zip code +4 designations for each customer, and storing for each customer zip code+4 designation according to the associated customer telephone number.

According to another aspect of the present invention, the method further includes recognizing an exception period for providing at least one alternate routing telephone number. When the exception period is recognized before the ascertaining step, the method further includes forwarding the call request to at least one alternate routing telephone number. Each alternate routing telephone number may be assigned according to one of a time of day, a day of the week, or a specific date. Each alternate routing telephone number may also be forwarded according to a predefined percent allocation distribution.

According to another aspect of the present invention, the exception period includes a plurality of exception periods, at least one exception period being associated with at least one routing telephone number associated with one of the plurality of subscriber locations. When one of the exception period is associated with the determined closest subscriber location, the method further includes forwarding the call request to at least one alternate routing telephone numbers. Each alternate routing telephone number may be assigned according to one of time of day, day of the week, specific date. Each alternate routing telephone numbers may also be forwarded according to a predefined percent allocation distribution.

According to another aspect of the present invention, the exception period includes a first and a second exception period, the first exception period being recognizable before the ascertaining step. When the first exception period is recognized, the method further includes forwarding the call request to at least one alternate routing telephone number. The second exception period includes a plurality of exception periods, at least one exception period being associated with at least one routing telephone number associated with one of the plurality of subscriber locations. When one of the exception period is associated with the determined closest subscriber location, the method further includes forwarding the call request to at least one alternate routing telephone numbers.

According to yet another aspect of the present invention, each alternate routing telephone number may be assigned according to one of a time of day, a day of the week, or a specific date. Each alternate routing telephone number may also be forwarded according to a predetermined percent allocation distribution.

Another aspect of the present invention is directed to an apparatus for routing an originating call to a subscriber location within a communications network. The network includes a two-way communication network interconnecting a plurality of service switching points and a plurality of dispersed network locations. The service switching points selectively establish a communication connection between at least two of the network locations in response to a call request from a calling party, and a service control point includes subscriber service logic. The network includes a plurality of subscriber locations. The apparatus includes a device for identifying a subscriber's service based on the call request from the calling party to establish a communication connection with the subscriber, a device for ascertaining a geographic location of the originating call in accordance with the originating telephone number of the calling party, a device for determining which of the plurality of subscriber locations is closest to the geographic location of the calling party, and a device for routing the originating call to the determined closest-.subscriber location.

According to another aspect of the present invention, the ascertaining step including means for receiving the originating telephone number and means for translating the originating telephone number into a zip code of call origination.

According to another aspect of the present invention, the ascertaining means includes a device for forwarding the call request to a predetermined default telephone number when the originating telephone number is not received by the service control point.

According to another aspect of the present invention, the apparatus further includes a device for limiting incoming calls to the identified service to calls originating within a predefined geographic area. The limiting device may be actuated after the service is identified and before the ascertaining device is actuated.

According to another aspect of the present invention, the predefined geographic area defining a market area of the subscriber and stored in a table in the service control point.

According to another aspect of the present invention, a device for forwarding calls originating outside of the predefined geographic area to an informational announcement.

According to another aspect of the present invention, the determining device includes a device for comparing the ascertained geographic location with a predefined list of subscriber service areas, the predefined list being stored within the service control point. The predefined list correlates each geographic location within the subscriber service area with a predefined terminating number of one of the plurality of subscriber locations.

According to another aspect of the present invention, the ascertaining device includes a device for querying an external database that includes a list of service provider customer telephone numbers and corresponding customer geographic information.

According to another aspect of the present invention, the customer information including zip code+4 information.

According to another aspect of the present invention, the apparatus further comprising a device for responding to the querying step by transmitting the geographic information related to the originating telephone number to the service control point.

According to another aspect of the present invention, the determining device forwarding the call request to a terminating telephone number of the closest subscriber location to the geographic location response.

According to another aspect of the present invention, the apparatus further includes a device for responding to the querying step by transmitting predetermined default geographic information when the originating telephone number is not listed in the external database.

According to another aspect of the present invention, the determining device forwarding the call request to a predetermined default telephone number when predetermined default geographic information is transmitted in the query response.

According to another aspect of the present invention, the ascertaining device further includes a device for waiting a predetermined time period for a response to the query to the external database and a device for forwarding the call request to a predetermined default routing telephone number if a response is not received within the predetermined period. The predetermined time period being between approximately 1.0 and 3.0 seconds.

According to another aspect of the present invention, the predefined list includes a plurality of geographic areas which comprise a predefined subscriber service area. Each geographic area listed is associated with a routing telephone number corresponding to one of the subscriber locations.

According to another aspect of the present invention, the determining device includes a device for comparing the ascertained geographic location with each geographic area listed in the predefined list. If one of the plurality of geographic areas corresponds to the ascertained geographic location, forwarding the call request to the associated routing telephone number and if one of the plurality of geographic areas does not correspond to the ascertained geographic location, forwarding the call request to a predetermined default routing telephone number.

According to another aspect of the present invention, each geographic area is listed according to it post office zip code+4 designation, and the comparing device for comparing the ascertained geographic location to the zip code+4 designation of each listed geographic area, wherein if no matches are found, comparing the ascertained geographic location to the zip code+3 designation of each listed geographic area, wherein if no matches are found, comparing the ascertained geographic location to the zip code+2 designation of each listed geographic area, wherein if no matches are found, comparing the ascertained geographic location to the zip code+1 designation of each listed geographic area, wherein if no matches are found, comparing the ascertained geographic location to the zip code+0 designation of each listed geographic area, and wherein if no matches are found, the call request is forwarded to a predetermined default routing telephone number.

According to another aspect of the present invention, the external database includes a line information database. The line information database includes a device for receiving service provider customer billing information for each associated customer telephone number, a device for stripping off post office zip code+4 designations for each customer, and a device for storing for each customer zip code+4 designation according to the associated customer telephone number.

According to another aspect of the present invention, the apparatus further includes a device for recognizing an exception period for providing at least one alternate routing telephone number. When the exception period is recognized before actuation of the ascertaining a device, the apparatus further includes a device for forwarding the call request to a one of the at least one alternate routing telephone number. Each of the at least one alternate routing telephone number is assigned according to one of time of day, day of the week, specific date. Each of the at least one alternate routing telephone number may be further forwarded according to percent allocation distribution.

According to another aspect of the present invention, the exception period includes a plurality of exception periods, at least one exception period being associated with at least one routing telephone number associated with one of the plurality of subscriber locations. When one of the exception period is associated with the determined closest subscriber location, the apparatus further includes a device for forwarding the call request to a one of the at least one alternate routing telephone numbers. Each of the at least one alternate routing telephone number is assigned according to one of time of day, day of the week, specific date. Each of the at least one alternate routing telephone numbers may be further forwarded according to percent allocation distribution.

According to another aspect of the present invention, the exception period includes a first and a second exception period, the first exception period being recognizable before the ascertaining step. When the first exception period is recognized, the apparatus further includes a device for forwarding the call request to a one of the at least one alternate routing telephone number. The second exception period includes a plurality of exception periods, at least one exception period being associated with at least one routing telephone number associated with one of the plurality of subscriber locations. When one of the exception period is associated with the determined closest subscriber location, the apparatus further includes a device for forwarding the call request to a one of the at least one alternate routing telephone numbers. Each of the at least one alternate routing telephone number is assigned according to one of time of day, day of the week, specific date. Each of the at least one alternate routing telephone number may be further forwarded according to percent allocation distribution.

Another aspect of the present invention is directed to an apparatus for routing an originating call to a subscriber location within a communications network. The network includes a two-way communication network interconnecting a plurality of service switching points and a plurality of dispersed network locations. The service switching points selectively establishing a communication connection between at least two of the network locations in response to a call request from a calling party, and a service control point includes subscriber service logic. The network includes a plurality of subscriber locations. The apparatus includes a device for accessing a subscriber's service logic associated with a subscriber's service from a telephone number input by the calling party, a device for transmitting a query to a database to determine a zip code associated with the calling party, a device for receiving a response from the database, the response including an associated zip code, a predefined look up table for associating each zip code within a subscriber service area with one of a predefined terminating telephone number and a default terminating number, the terminating telephone number associated with a subscriber location predefined to receive calls originating within the associated zip code, a device for looking up the received response from the database to determine the terminating number, and a device for routing the originating call to the determined terminating number.

According to another aspect of the present invention, the apparatus further includes a forwarding device for bypassing the subscriber's service during one of a predetermined day of the week, time of day, and specific date. The forwarding device includes a device for routing the originating call to an alternate routing number associated with the forwarding a device.

According to another aspect of the present invention, the apparatus further includes a forwarding device for rerouting the originating call from the determined terminating number to an alternate routing number during one of a predetermined day of the week time of day, and specific date.

According to another aspect of the present invention, the apparatus further includes an error detection device for detecting at least one predetermined error occurring during the call request.

According to yet another aspect of the present invention, the error detection device includes a recording and compiling device for recording the at least one predetermined error occurring during the call request and for compiling the at least one predetermined error in a predefined format.

According to a further aspect of the present invention, the at least one predetermined error includes at least one of no originating number delivered to the subscriber's service logic, the originating number not found in the database, the originating number found in the database without a corresponding zip code, the zip code not found in the predefined look-up table, timeout, query error to database, response error from database, the originating number not originating from a participating carrier, and originating call from outside of the predefined subscriber locations.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein:

FIG. 3 shows an exemplary table for defining a subscriber's service area by correlating local zip codes with satellite office routing telephone numbers;

FIG. 4 shows an exemplary table for use with a Market Area Screening service of the invention;

FIG. 6 shows an exemplary NPA-NXX table for determining whether a caller's NPA-NXX is supported by the external database;

FIG. 8 shows an example LATA table that may be stored within the ISCP;

DETAILED DESCRIPTION OF THE PREFERRED EMBODIMENTS

Many telephone services may be provided using an AIN or AIN-type network for centralized control of telephone services offered to subscribers, as opposed to localized control of services at the Central Office (CO). The AIN system is provided through interaction between switching points and other systems supporting AIN logic.

The AIN based single telephone number routing service of the present invention may be implemented using at least AIN Release 0.1 and 0.0 protocols, software and hardware for the line information data base (LIDB), and other AIN capabilities, including programmable service control points (SCPs), central offices equipped with AIN service switching point (SSP) features, and existing Common Channel Signaling (CCS) networks. The Signaling System 7 (SS7) network is a widely used CCS network that provides two-way communication of Transaction Capabilities Application Part (TCAP) formatted data messages between the SCP and the SSP. The AIN based system essentially employs an upper-level software network through the SSPs and the SCP. The upper-level software resides over the service hardware to check the call route and the availability of connection prior to hardware connection.

Although the various embodiments of the invention described herein make reference to particular AIN implemented features and structures, other AIN and AIN type architectures and components may be used to provide and implement the present invention.

Figure 1:
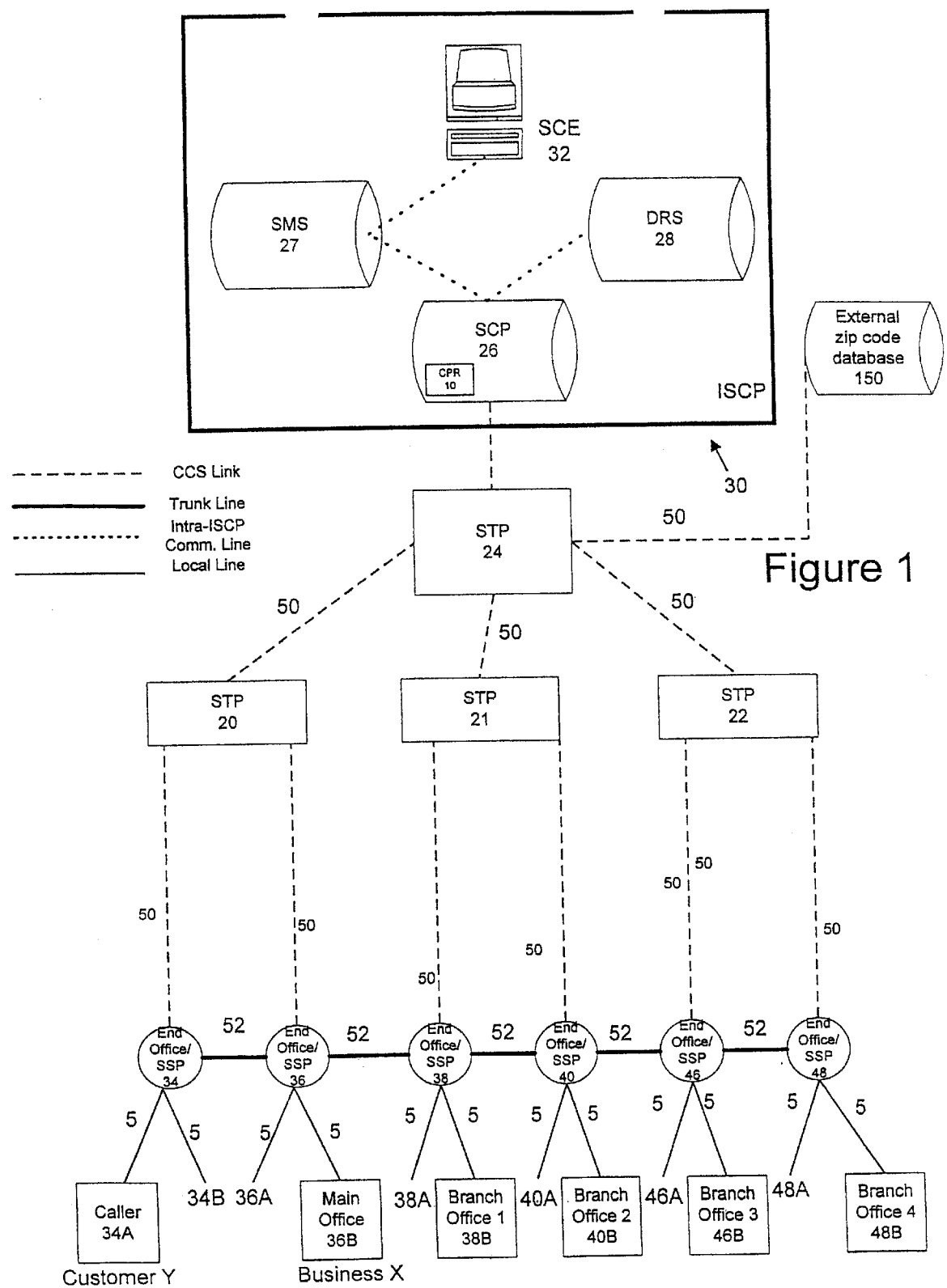
FIG. 1 illustrates, in a general block diagram form, an Advanced Intelligent Network (AIN) system for implementing intelligent single telephone number routing features according to an aspect of the present invention.

Referring now to the accompanying drawings, FIG. 1 illustrates a general block diagram of an Advanced Intelligent Network (AIN) in which an apparatus and method for intelligent single telephone number routing is embodied in accordance with an aspect of the present invention. In FIG. 1, local telephone lines 5 connect a plurality of individual network locations 34A–48B in each geographic area to the closest Central Office (CO), or End Office (EO) 34–48.

End Offices 34–48 are equipped as AIN SSPs to allow normal switch call processing to be suspended at specific points in a telephone call, enabling TCAP formatted query and response messages to be transmitted between the SSP and ISCP. AIN queries will be routed from a central office or switching service point to a local STP using existing SS7 links. These queries will then be routed from the local STP to the regional STP, and from the regional STP to the ISCP. The SS7 message routing should be devised to minimize the need for data administration at the local and regional STPs. A capability code may be established at the STPs that serve the SCP. This capability code is used by the SSPs and the STPs to do point code routing until the message is received by the "last" STP pair (that is, serving the SCP). STPs within the network are equipped to route AIN SS7 messages from SSPs to ISCPs based upon six digit global title translations. For example, NPA-NXX of the single telephone number may be translated by the STP to destination point code (DPC) of ISCP running the single telephone number application for that single number.

The SSPs may include, but are not limited to, 5ESS, 1AESS, and DMS-100 switches. The trigger on the 5ESS switch may be an AIN type 10 digit trigger. The trigger may be based upon AIN Release 0.1 protocol and preferably AIN Release 0.1 query call variables may be converted into common call variables by a call processing record (CPR) in ISCP 30. If a 5ESS switch is utilized, then these switches should be equipped with Generic 5E9(1) (or higher) and provided the necessary trigger requirements (discussed below) in order to serve subscribers. The trigger on a 1AESS switch may be a dialed line number trigger based upon a 10 digit virtual number. The trigger may be based upon the AIN Release 0.0 protocol and preferably AIN Release 0.0 query call variables may be converted into common call variables by a CPR in the ISCP. Further, if 1AESS switches are employed, they should be equipped with Generic 1AE12.03 (or higher) and provided the necessary trigger requirements in order to serve subscribers. The trigger on the DMS-100 switch may be a termination attempt trigger (TAT) based upon the AIN Release 0.1 protocol and preferably AIN Release 0.1 query call variables may be converted into common call variables by a CPR in the ISCP 30. Further, if DMS-100 switches are used, NA003, Release 2 (or higher) should be provided.

Triggers in switches may have certain identifiable parameters, including the telephone number with the trigger that permit the SSP and ISCP to synchronize their mutually supporting activities. On its end, the ISCP uses the trigger identifiable parameters to select the proper CPR to implement the technique of converting the call variables that accompany the query with trigger identifiable parameters into common call variables.

For purposes of illustration, six SSPs are shown in FIG. 1. The actual network may be provisioned with more (or less) than the number of SSPs shown in FIG. 1. The SSPs 34–48 are switches which perform the following function: recognize AIN-type calls; launch queries to an Integrated-Service Control Point (ISCP) 30; and, receive commands and data from the ISCP 30 to further process and route AIN-type calls. When one of the SSPs 34–48 is triggered by an AIN-type call, the SSP formulates an AIN service request and responds to call processing instructions from the network element in which the AIN service logic resides. The AIN service logic or control software may reside in a database at the Service Control Point (SCP) 26. The SSPs are connected by trunked communication lines 52 which are used to connect and carry communication signals, e.g., voice and/or data, from a calling party to a called party.

In FIG. 1, the SSPs are shown equipped with Common Channel Signaling (CCS) capabilities, e.g., Signaling System 7 (SS7), which provides for two-way communications of data messages between each SSP and the ISCP 30 via CCS links 50. The data messages are formatted in accordance with the Transaction Capabilities Applications Part (TCAP). As shown in FIG. 1, each SSP 34 and 36 may be connected to a first local area Signaling Transfer Point (STP) 20 by SS7 link 50;

each SSP 38 and 40 may be connected by SS7 link 50 to STP 21; and each SSP 46 and 48 may be connected by SS7 link 50 to STP 22. The connections by links 50 to the STPs are for signaling purposes, and allow the SSPs to send and receive messages to and from the ISCP 30 via the STPs. Each of the STPs can be connected to a large number of other STPs. For purposes of illustration in FIG. 1, SS7 links 50 are shown as connecting local STPs 20, 21, and 22 to a regional STP 24 and connecting the regional STP 24 to the ISCP 30.

The ISCP 30 is an integrated system which may include a Service Management System (SMS) 27, a Data and Reports System (DRS) 28, a programmable Service Control Point (SCP) 26, and a Service Creation Environment (SCE) 32. The SCE 32 is a software based terminal that may be implemented to work with the SMS 27 to create, modify, and load service control software (i.e., service logic) into the database in the SCP 26. The SCP 26 executes software-based service logic and may return call routing instructions to the SSPs. The SMS 27 and the DRS 28 may be provided for compiling calling information to be used for billing and administrative purposes. By way of example, the ISCP 30 may be implemented with the Bellcore Integrated Service Control Point (ISCP), loaded with preferably at least ISCP software Version 4.0, available from Bell Communications Research, Inc., of Livingston, N.J.

The SCP 26 may be linked to an external database 150 that stores various routing information, e.g., information for translating an originating telephone number into the caller's geographic location of origin. The external database 150 may be linked to STP 24 via data communication links and include, e.g., a line information database (LIDB) running preferably at least software Version LIDB 7.0, available from Bell Communications Research, Inc., of Livingston, N.J. Alternatively, external database 150 may be directly accessed by and connected to SCP 26 via a TCP/IP connection (not shown).

Advanced Intelligent Network (AIN) call processing differs from standard telephone call processing in that a query to a centralized database, e.g., ISCP 30, is triggered by an AIN application. In AIN-type call processing, an SSP is responsible for identifying calls associated with AIN services, detecting when conditions for AIN service involvement are met, formulating service requests for call processing instructions, and responding to the instructions received. As with normal call processing, the call may be suspended at the calling party's end office or switch equipped as an SSP and may send a data message, via the SS7 links 50, to the STPs to establish the call route. AIN services are created by assigning appropriate SSP call suspension points, known as AIN "triggers", accessed via customer lines or is telephone numbers, and accessing customer or service-specific logic in the ISCP 30.

The SSPs launching the AIN queries are preferably end office AIN SSPs, 34–48. This enables the trigger for the subscriber service to be placed at the end office serving the NPA-NXX of the single telephone number trigger and allows the trigger to use trunks 52 or other facilities, i.e., inter-LATA, international, etc., for call routing. Thus, if an originating call encounters an AIN trigger at the end office designated to receive the NPA-NXX of the single telephone number trigger, i.e., triggering AIN service involvement, the SSP, e.g., 36, suspends call processing, then queries the ISCP 30 through the STPs 20 and 24 over the SS7 links 50.

For purposes of illustration, assume that a business (Business X), e.g., a food delivery service, has a main office at location 36B, four satellite (branch) offices located throughout the local telephone service area at locations 38B, 40B, 46B, and 48B, and subscribes to the intelligent single telephone number zip code routing service. Assume that Business X advertises its single telephone number, e.g., 987-6543, which is a telephone number (i.e., NPA-NXX) served from end office 40. Also assume that a customer (customer Y) at location 34A desires food to be delivered from Business X. Customer Y picks up the receiver at 34A and gets a dial tone from end office/SSP 34, Customer Y may dial the single telephone number publicized by Business X, e.g., 987-6543, from originating location 34A, ultimately offering connection to the nearest delivery office of Business X, e.g., Main Office at location 36B. The AIN trigger may be established in the SSP end office that serves the NXX of the single telephone number, i.e., end office 40; however, the system should not be construed as limited to this arrangement, for example, the AIN trigger could be established at the originating end office that is equipped as an SSP or at a local or LATA tandem switch equipped as an SSP. In FIG. 1, end office/SSP 34 routes the call over trunks 52 to end office/SSP 40. End office/SSP 40 then receives the call and is triggered. As a result, end office/SSP 40 launches a message, over links 50, to query SCP 26. SCP 26: then responds back to end office/SSP 40 with routing information, and end office/SSP 40 routes the call over trunks 52 to end office/SSP 36. End office/SSP 36 rings location 36B, and Business X at location 36B may answer to complete the communication path.

Upon receiving the query message from the AIN SSP equipped end office 40, the ISCP 30 executes software based service logic programs stored in the SCP 26 to perform subscriber functions, e.g., establishing a routing number based upon the geographic location of the originating party, and returns a response to the end office 40 with call routing instructions to forward the call to the appropriate location (e.g., location 36B). The AIN service application, e.g., CPR 10, may be stored in an ISCP database, e.g., the SCP 26, and accessed by a predetermined SSP query launched from the triggering location, e.g., location 40.

As noted above, new services may be created by assigning appropriate SSP AIN triggers-to subscriber lines or telephone numbers to access subscriber and/or service-specific logic in the ISCP. The intelligent single telephone number zip code routing service features of the present invention may be provisioned via SSP triggers implemented with the 10 digit part of the 3/6/10 digit trigger in AIN Release 0.1 for 5ESS switches, the Terminating Attempt Trigger (TAT) in AIN Release 0.1 for DMS-100 switches, or the office based (DN) trigger in AIN Release 0.0 for 1AESS switches.

When the ISCP 30 receives a query, the advanced intelligent single telephone number zip code routing service logic will be executed. Call data may be collected and recorded in the DRS 28, as per the normal ISCP SAMPLE node operation. For example, the ISCP 30 may contain resident service software that collects the calling (originating) telephone number, and called (terminating) telephone number. This resident service software may also collect the date and the time of certain predetermined error conditions that may arise during each query to the ISCP 30. A call processing record 10 may also be provided that is stored within the SCP 26. The CPR 10 may contain the service logic for each trigger, zip code translation, and call routing. The features of the CPR 10 are more fully discussed below with reference to FIGS. 5, 7, 9, 11, and 13.

After the ISCP 30 has collected the call data, the ISCP 30 will then return control of the call, via a routing number, to the call suspending SSP for termination. The routing number for this service will generally be the telephone number of the closest satellite office of the subscriber to the originating party's geographic location.

Once the subscribed service logic has been completed, control of the originating call may be returned to the triggering SSP. To complete the originating phone call, the ISCP service logic for this service may respond to the SSP query in one of two possible responses. The service may respond with a routing number in a TCAP connect message to the triggering SSP or respond with a message to play an announcement to the caller, e.g., to indicate that the caller is not within the subscriber's service area.

SINGLE TELEPHONE NUMBER ROUTING

Figure 2:
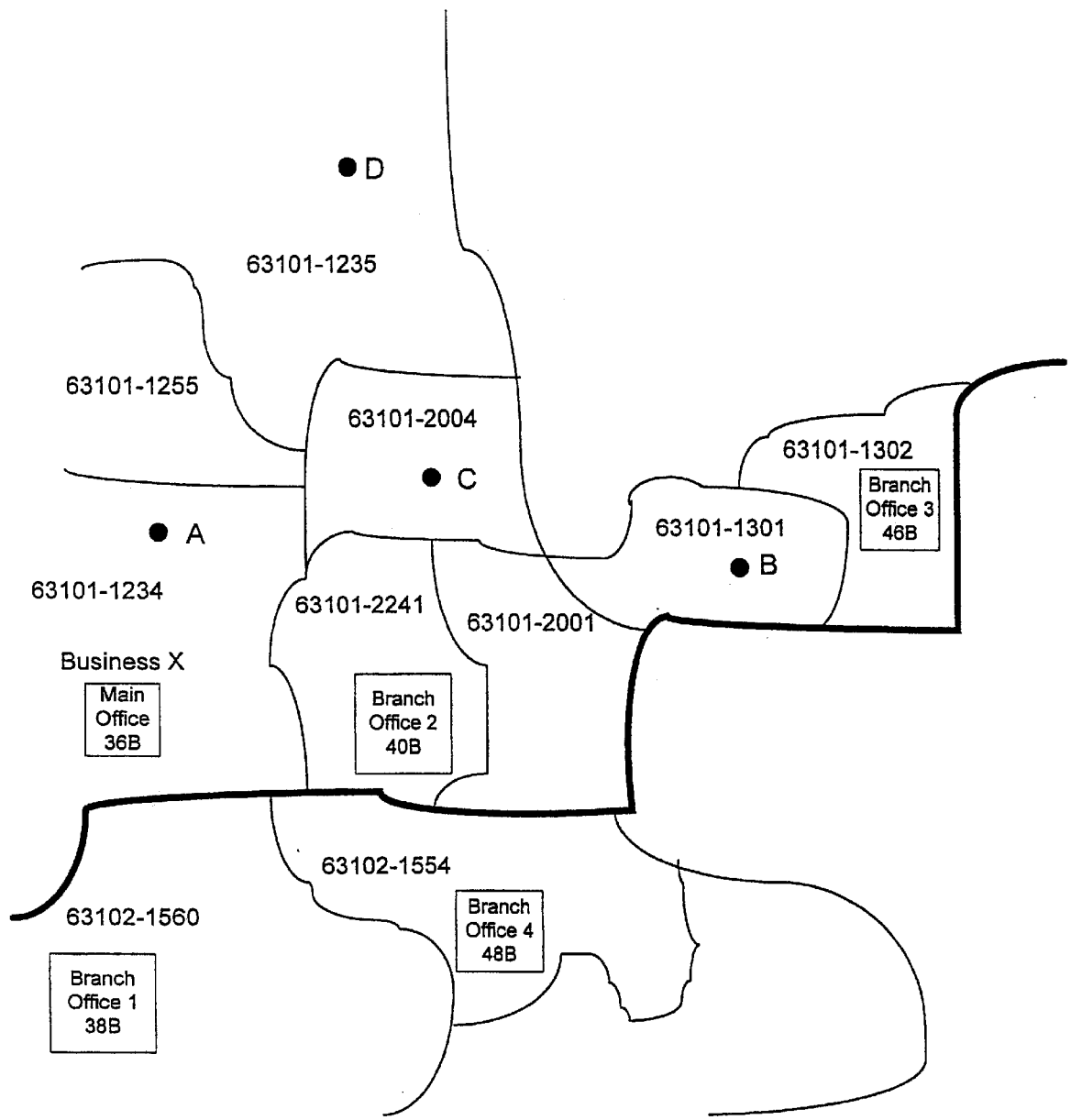
FIG. 2 shows an exemplary representation of a local service area of a subscriber.

As noted above, the single telephone number zip code routing feature is a geographic routing service that may be used for by business subscribers doing business from or providing services from more than one local area office. For example, as shown in FIG. 2, a portion of local telephone service area is shown which includes zip codes 63101 and 63102, each zip code further divided with a zip code+4 designation. Assume that Business X has its main office at 36B and 4 branch or satellite offices dispersed throughout the local area at locations 38B, 40B, 46B, and 48B. Business X subscribes to the single telephone number zip code routing service so that caller's within Business X's service area may call one telephone number and be automatically connected with the nearest Business X office.

To initiate service, business subscribers must predefine the service area from which calls are to be routed. For example, the business may define a service area according to a 5 to 9 digit zip code, 9 digits being more specific and preferred. Telephone calls offered to the single telephone number zip code service will be translated to determine the 5 to 9 digit zip code of the caller and identify which branch office of the subscriber to route the call based on the caller's zip code.

FIG. 3 shows one example of predefining the service area. The service area information may be provided in a look-up table that is stored in SCP 26. The service information may be provided in various layouts, e.g., 10 digit telephone number fields, zip code fields, and other fields. In FIG. 3, the first column defines the zip code of the originating (or calling) party. The second column of FIG. 3 defines the routing number for calls originating from the corresponding zip code. According to the example of FIG. 3, Business X has defined the area codes 63101 and 63102 as the general service area. Any calls originating from the nine digit zip code 63101-1234 will be routed to (314) 380-8500. It is noted that the nine digit zip code is not required for predefining a service area, i.e., the service area may be predefined by any length zip code between five to nine digits. Thus, where the satellite offices are less densely populated, the service area may be defined by, e.g., seven digits (zip code+2) (see, e.g., row 3 of FIG. 3). The initial service information should also include a single telephone number (i.e., the number that "triggers" AIN processing at the SSP), a carrier identification code for any inter-LATA routing telephone number, a default, routing telephone number, and an enable/disable for a market area screening option. The default telephone number is important in that any calls that cannot be routed according to the caller's geographic location are automatically routed to the subscriber's predefined default location for handling such matters. If the market area option has also been selected, the market area, defined by NPA-NXXs, must also be included to designate the areas from which calls will be allowed.

While the numbers in the zip code column may appear only once, a store location terminating (routing) number is not limited in the number of zip codes with which it may be associated. Further, due to how the table is searched by the service logic, i.e., 9 digit zip codes are searched then 8 digit, etc., it should be noted that 63101-1234 and 63101-123 would not cover the same zip codes. That is, 63101-1234 only covers 63101-1234, while 63101-123 covers all zip codes beginning with 63101-123 except 63101-1234 (and any additional 9 digit zip codes within the predefined table with a 63101-123 root).

The initial service information may be input into the ISCP via a computer workstation interface by a service representative of the service provider. The data may be uploaded or transferred to the ISCP. For example, a SPACE workstation interface (available from Bellcore) may be used to interface and transfer information to the ISCP. The subscriber may provide the service representative with the zip codes to route telephone numbers in a predefined service table stored in a file format on magnetic (or floppy) disk, e.g., ASCII, DOS using Excel or Lotus 1-2-3 spreadsheets, etc. Each subscriber table may contain a plurality of records, each record including two fields, i.e., a 5 to 9 digit zip code and an associated 10 digit routing telephone number (see, e.g., FIG. 3). The fields within a subscriber table may be separated by a tab and each record may be separated by returns.

As predefined in the example of FIG. 3, a telephone call originating from location A, (in zip code 63101-1234 of FIG. 2), will be directed to telephone number (314) 380-8500 or Business X main location 36B. A call originating from location B (in zip code 63101-1301) will be routed to telephone number (314) 380-8502 or branch office 3 at location 46B. A call originating at location C (in zip code 63101-2004) will be routed to telephone number (314) 364-4677 or branch office 2 at location 40B. However, a call from location D (zip code 63101-1235) cannot be routed through the predefined table of FIG. 3. Accordingly, a call originating from this location must be forwarded to a default number or to a recording (e.g., "we are sorry, but the company you are calling does not currently serve your area with this telephone number. Please call or visit one of their convenient locations listed in your local telephone directory. Thank you for calling."). If location D is within the desired service area of the subscriber, the predefined table of FIG. 3 should be revised so that a routing number is defined for call originating within that zip code+4 service area.

The single telephone number zip code routing service, i.e., "simple" single telephone number zip code routing service, may also be combined with other features, e.g., day of the week/time of day routing; specific date routing; and percent allocation routing, to provide more "complex" routing services. For example, the single telephone number zip code routing service of the present application may be combined with one or more of the AIN routing services as disclosed in commonly owned U.S. Application No. 08/455,024, filed May 31, 1995, entitled "Apparatus and Method for Forwarding Incoming Calls", the disclosure of which is incorporated herein by reference in its entirety.

In general, the AIN trigger may be established in the SSP end office that serves the NXX of the subscriber's single telephone number. The single telephone number may arrive at the SSP end office by normal network translations, i.e., the call may be directed to the called number serviced by the SSP end office. Once the offered call reaches the SSP end office, the single telephone number call may actuate the AIN trigger, which will suspend call processing while the SSP end office queries the ISCP to determine which appropriate branch office to route the offered call. The SSP end office may then route the offered call to a location as directed by the ISCP response message.

1. Trigger Requirements

The single telephone number zip code routing service of the present invention preferably employs a terminating trigger strategy in which the trigger may be provisioned within the end office of the NXX of the single telephone number. This preferred strategy simplifies the overall service because the ISCP logic for the single telephone number routing service may be limited to the trigger type and AIN Release number of the end office serving the NXX of the single telephone number and because any impact on switching memory, due to announcements or digit collection functionality implementation, may occur only on the end office serving the NXX of the single telephone number.

As indicated above, the present invention may be implemented with: 5ESS, 1AESS, and/or DMS-100 switches. The trigger on the 5ESS switch is a 10 Digit Trigger. The trigger may be based upon AIN Release 0.1 protocol and may preferably require that AIN Release 0.1 query call variables be converted into common call variables by a CPR in the ISCP 30. If the 5ESS switch is utilized, then these switches should be equipped with Generic 5E9(1) (or higher) and provided the necessary trigger requirements in order to serve subscribers. The trigger on the 1AESS switch may be a dialed line number (DN) trigger based upon a 10 digit virtual number. The trigger may be based upon the AIN Release 0.0 protocol and may preferably require AIN Release 0.0 query call variables to be converted into common call variables by a CPR in the ISCP 30. Further, if 1AESS switches are employed, they should preferably be equipped with Generic 1AE12.03 (or higher) and provided the necessary trigger requirements in order to serve subscribers. The trigger of the DMS-100 switch may utilize a termination attempt trigger (TAT) based upon the AIN Release 0.1 protocol and may preferably require AIN Release 0.1 query call variables to be converted into common call variables by a CPR in the ISCP 30. Further, if DMS-100 switches are used, NA003, Release 2 (or higher) should preferably be provided.

A DN trigger is one of several triggers in the originating call model. The 1AESS DN trigger has the same characteristics of the 5ESS 3/6/10 digit trigger. Calls routed by such an SSP may suspend processing after completing digit analysis and query the ISCP for further instructions. Like the 3/6/10 digit trigger, the DN trigger may be provisioned to recognize either NPA, NPA-NXX, or NPA-NXX-XXXX. For the single telephone number routing service, the ten digit trigger is preferably employed.

The TAT may be the only trigger detected in the terminating call model. This trigger may be detected in the null state of the terminating call model at the point when it has been determined that a connection between some originating facility is to be made to the DN to which the termination attempt trigger is assigned. When an SSP encounters a TAT, a terminating attempt query is launched prior to choosing the specific port to seize and the call is routed via instructions from the ISCP. It is noted that only analog lines can be provisioned as TATs and that the termination attempt trigger may be the only true terminating trigger defined within AIN Release 0.1.

According to an aspect of the present invention, the single telephone number that triggers AIN processing may be a virtual number, i.e., the single telephone number is not a routing number option. While provisioning the service in this manner may technically be possible with the TAT trigger on the DMS-100, the 3/6/10 trigger of the 5ESS, and the DN trigger on the 1AESS, calls intended for termination at the routing number may not be terminated as desired. That is, a call intended for the routing number would preferably always trigger the AIN service and, therefore, be redirected to the nearest office to the caller. Use of a virtual single telephone number enables customers to dial a specific office of the subscriber directly, if necessary.

The virtual single telephone number is not preferred as the default routing number. This is because, at some time it may be necessary or desired for the subscriber to change the default routing number. If changed, the single telephone number would most likely have to change, thus severely damaging advertising and goodwill expended by the subscriber in promoting their single telephone number to the public.

Because the trigger is located within the SSP end office of the NXX of the virtual single telephone number, there are no specific requirements for access by a caller to the single telephone number. The single telephone number may be accessed by any caller on any switch simply by dialing. In fact, any dialable telephone number on a 1AESS, 5ESS, or DMS-100 switch can be used as the single telephone number, although underlying physical facilities may have to be changed or eliminated.

a. 5ESS Procedures

The 3/6/10 digit trigger may be provisioned on the 5ESS for the single telephone number routing service. There is no limit on the number of simultaneous re-routed calls with the 3/6/10 digit trigger response message. The 5ESS response timer for a query to the ISCP may need to be increased from 3 to 4 seconds, depending on benchmarking of the SS7 LIDB get data query. The time-out limit applies only to the SSP where the single telephone number trigger is provisioned. The SSP timer includes the time interval for the ISCP single telephone number call processing record (CPR) execution and ISCP get data query to the zip code LIDB DB, which may be, e.g., 0.6 seconds for a LIDB SCP get data query.

Some callers, e.g., those with four party service, coin telephones, etc., may not be able to access single number service.

However, a 5ESS switch based call forwarding response message to a terminating attempt trigger may include intra- and inter-forwarding limits, thus, limiting the number of simultaneously forwarded calls from the same TAT DN. The upper limit of the number of calls forwarded for a 5ESS is 99. Because it is likely that larger subscribers may have well over 100 simultaneously forwarded calls at any given time (especially during normal business hours), the TAT of the 5ESS may not be employed for the single telephone number service.

b. DMS-100 Procedures

The TAT trigger may be provisioned on the DMS-100 for single telephone number routing service. The DMS response timer for a query to the ISCP may need to be increased from 3 to 4 seconds, depending upon benchmarking of the SS7 LIDB get data query. This time-out limit applies only to the SSP where the single telephone number trigger is provisioned. The SSP timer includes the time interval for the ISCP single telephone number routing service CPR execution and ISCP get data query to the zip code LIDB DB, which may be, e.g., 0.6 seconds for a LIDB SCP get data query.

Lines and trunks able to originate calls to any AIN 0.1 trigger (including TAT) include: public lines—single party flat rate, single party measured rate, PBX line flat rate, PBX line measured rate; private lines—integrated business network, e.g., CENTREX, electronic business set; public trunks—intertoll trunks, trunk incoming, trunk 2 way; and private trunks—trunk incoming, trunk 2 way, and primary rate interface. The lines and trunks must be supported in NA003, Release 2. Unsupported lines may not originate calls to an AIN trigger for intraoffice calls, i.e., lines terminating in the SSP where the AIN trigger is provisioned. However, for example, a DMS two-party flat rate line may make calls to a triggered number in another office by supported trunk types.

The DMS-100 terminating attempt trigger forward call response message does not have intra- or inter-forward limits. However, if a limit is placed on the number of simultaneously forwarded calls, an option on the DMS-100 is to set a maximum of simultaneous forwarded calls to 1024, which should be sufficient for even large subscribers.

c. 1AESS Procedures

The DN trigger may be provisioned on the 1AESS for single telephone number routing. The DN trigger response message has no limit on the number of simultaneous re-routed calls. The 1AESS response timer for a query to the ISCP may need to be increased from 3 to 4 seconds, depending upon Bellcore's benchmarking of the SS7 LIDB get data query. The 1AESS response timer in V12.03 (ASP3), which may be tunable by an office option record. The time-out applies only to the SSP where the single telephone number trigger is provisioned. The SSP timer includes the time interval for ISCP single telephone number routing CPR execution and ISCP get data query to the zip code LIDB DB, which may be, e.g., 0.6 seconds for a LIDS SCP get data query.

DN triggers may not be encountered on incoming calls received by Type 1 or Type 2 trunk groups. These trunk groups are preferably converted, e.g., during SS7/AIN conversion, to Type 10 or Type 15 in order to receive DN trigger treatment.

2. "Simple" Single Telephone Number Zip Code Routing

The "simple" single telephone number zip code routing service (i.e., routing based only on geographic location) may include templated service logic to perform the zip code routing functionality. Because the query/response for each SSP trigger to ISCP is different and query/response for each ISCP-to-zip code+4 is identical, it is preferred to employ four CPRs within the ISCP for accomplishing the single telephone number zip code routing service. That is, the templated service includes three trigger CPRs (one trigger CPR for each of the DMS-100, the 1AESS, and the 5ESS) and one zip code CPR for translating the CPN to the zip code+4 of the caller. Of course, the number of CPRs used may vary depending on the number of different types of SSP equipped switches employed.

While each of the trigger CPRs may be different, the logical steps may be the same. That is, the differences, e.g., AIN Release 0.1 or 0.0 response call variables, are dependent upon the inherent differences in each particular trigger, as discussed above.

Figure 5:
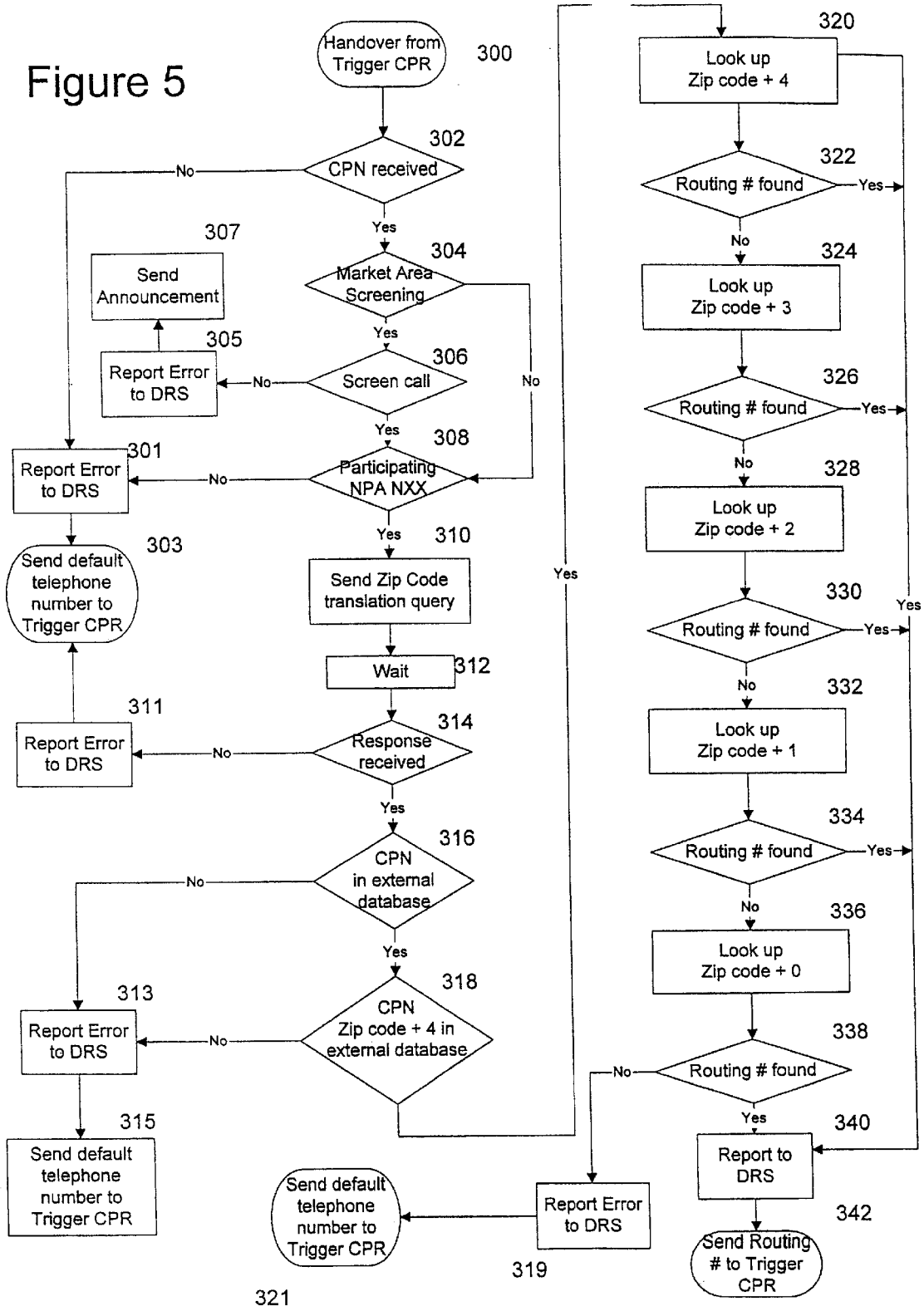
FIG. 5 is an example of a flow diagram for a zip code CPR for implementing the features of the invention.

The single telephone number routing service, both the "simple" and "complex" versions, employs a universal zip code CPR for translating the originating caller's CPN into the caller's zip code+4. The zip code CPR, receiving handover control from the trigger CPR (discussed below), may be of template design. However, certain subscriber options, e.g. market area screening, may be available even though the service logic of the simple single telephone number zip code routing service is designed as templated service logic. Market area screening enables the subscriber to screen areas of the local service from service access, e.g., if no offices are nearby, etc. Market area screening may also be desirable because if the subscriber is responsible for billing after the originating call triggers the SSP, the subscriber can limit the occurrence of toll call forwardings. According to an aspect of the invention, the single telephone number zip code routing service may also include service logic to create records and reports regarding service operation. To aid in the determination and/or correction of various errors or service problems, the single telephone number zip code routing service may identify and classify errors by cause. An exemplary flow diagram of the zip code CPR, which resides within the ISCP and performs the translation of originating telephone number to the caller's zip code+4, is shown in FIG. 5. At step 300, a query message transmitting the common call variables from the triggered SSP to the ISCP is received. The SCP, at step 302, determines whether the customer phone number (CPN) of the calling party has been received. If no CPN has been received, then the logic proceeds to step 301 to report data to the DRS that an error has occurred, i.e, the CPN was not received, and then proceeds to step 303 to send a response to the trigger CPR to route to the default number. The CPN will generally not be delivered from non-SS7 offices, non-participating independent telephone companies, cellular calls, etc. However, it is noted that cellular SS7 conversion may make it possible for the CPN of a cellular telephone to be passed to the ISCP.

If the CPN has been received, the logic determines, in step 304, whether the market area screening option has been subscribed to. If there is no market screening option, the logic proceeds to step 308. If there is a market screening option, then the logic flow of the CPR proceeds to step 306, and it is determined whether the caller's NPA-NXX is within the subscriber's defined service area by accessing the table shown in FIG. 4. FIG. 4 is a look-up table that defines the subscriber's market area in terms of NPA-NXXs. The look-up table may be stored in a database accessible by the SCP and may be employed to determine whether the caller's NPA-NXX is within the subscriber's defined market area. If the caller's NPA-NXX was not within the subscriber's service area, an error message that the call is from outside of the subscriber's service area may be reported to the DRS in step 305 and an response to play an announcement is forwarded to the trigger CPR at step 307. The announcement may inform the caller that the call is not within the specified service area of the subscriber, e.g., "We are sorry but the company you are calling does not currently serve your area with this telephone number. Please call or visit one of their convenient locations listed in your local telephone directory. Thank you for calling." If the caller's NPA-NXX is within the defined market area of the subscriber, the logic proceeds to step 308.

At step 308, the ISCP determines whether the caller's NPA-NXX belongs to either the service provider or a participating independent local exchange carrier (ILEC). To analyze the NPA-NXX, the SCP may access an NPA-NXX table, for example, as shown in FIG. 6. The NPA-NXX table may be stored in a database accessible by the SCP and may be employed to determine whether the caller's NPA-NXX may be supported by the external zip code database of the service provider or a participating ITC. This screening is performed to ensure that the query is not lost or rejected by the SS7 network, the service provider, or an ITC (whether participating or not). The company identification codes may be unique to the single telephone number routing service and may be placed in the table for performance measurements. The service provider may be indicated, e.g., as "0". Company identification codes, i.e., the participating ILECs may be designated as, e.g., 100, 200, etc., and may be supported by the performance measurement service logic. Thus, the pre-screening keeps performance results from being distorted for not having zip codes for a CPN which the service provider cannot get.

If the NPA-NXX is not listed in the NPA-NXX table, step 301 reports an error message that the call is a non-service provisioner originated call to DRS and a response is sent to the triggering CPR to connect the call to the default number at step 303. If the NPA-NXX is listed, the logic proceeds to step 310 to get the caller's zip code from, e.g., an external zip code database.

The caller's CPN may be matched with entries in a database external to the ISCP. For example, the CPN may be transmitted via an SS7 query to convert the CPN to the caller's zip code+4. Alternatively, the query may be directly transmitted over a TCP/IP network from the ISCP 30. The transmission over SS7 may be, e.g., a GetData command to the external zip code database. The external database may be maintained.by the service provider or one of the ILECs. For example, if the NPA-NXX table showed a company identification of "0", the GetData query would be transmitted to a service provider database; if the company identification "100" was found in the NPA-NXX table, the query would be transmitted to a database maintained by the company identified a "100". The query is received by the external database and the CPN is compared to a list of telephone customer telephone numbers (working telephone numbers). Each listed telephone number has a zip code+4 associated with it, and the associated zip code +4 may be sent back to the ISCP via the SS7. Information and details on GetData parameters may be found in Bellcore Document GR-2838-CORE (Generic Requirements for GetData), Issue Aug. 1, 1994 and in Section 13.6 (LIDB Interface/GetData Interface) thereof for error response messages; the disclosure of this Bellcore document is expressly incorporated herein by reference in its entirety.

The interface between the ISCP and external zip code database may be over SS7 or TCP/IP. Further, it is preferred that the external database be maintained as a redundant mated pair. Thus, the ISCP may query either of the redundant mated pairs of databases if GTT routing is supported, e.g., ISCP software Version 4.0 or may query only one LIDB in point-to-point routing if GTT routing is not supported, e.g., ISCP software Version 4.0. GTT routing is preferred because it will allow ISCP querying to either database in the event one of the pair fails.

The external CPN-to-zip code database may be created and maintained by the service provider for all single telephone number zip code routing service subscribers. The CPN and its associated zip code is corporate data, not customer specific data, and, therefore, may also be accessed by other services needing a CPN-to-zip code conversion. The external database may be considered a network element as it is involved in call processing. The Line Information Data Base (LIDB) may be used to store the CPN and associated zip codes. The LIDB may concurrently store the service provider's working telephone numbers (WTN) and the zip codes associated with each WTN may be added to the LIDB. CPN-to-zip code databases for participating independent companies, i.e., non-service providers, should be maintained by those companies.

The CPN and associated customer address, which may be used to generate a zip code, may be derived from the service provider billing database. A validating system, e.g., a billing validation distribution system (BVDS), may read a Customer Record Information Service (CRIS) unload file to determine the address associated with each CPN. The zip code associated with the CPN may be based on the service address, and may be determined by the presence of various address fields which are part of the service provider's general billing information, e.g., different premise address (DPA), service listed address (SLA), service address (SA), and listed address (LA). Once the service address has been determined, the validating system will assign a zip code+4 designation to an administrative system, e.g., a line validation administration system (LVAS). The LVAS and GetData Interface are two possible direct interfaces into the CPN-to-zip code database.

The LVAS is generally an administrative system. The LVAS may include a mirror image of LIDB and may perform continuous audits to ensure informational synchronization with LIDB and CRIS. The LVAS may provide access to the LIDB through daily batch updates to add and delete CPNs and associated zip codes, although it may be necessary to modify the LVAS to accept 9 digit zip codes from the BVDS. The LVAS may use a stored program to assign zip code+4 to the WTN, e.g., FINALIST. In addition to adding and/or updating customer WTNs, it may be necessary to update the zip code+4 information. Periodically the U.S. Postal Service may modify the zip code information, which must be updated in the LIDB as discussed above. Thus, the entire CPN-to-zip code+4 database should be updated periodically, e.g., twice a year, by rerunning the zip code+4logic, discussed above. An on-line LVAS may provide direct access to update CPNs and associated zip codes as needed. The GetData interface is a service independent LIDB query that may request specific data elements from a record in LIDB. GetData comprises an identifier to signify a GetData query, a service key to indicate the line record within LIDB for the information sought, and a set of LIDB data elements identified by unique TCAP data element identifiers about data that the ISCP wants to receive. Based upon the information in the GetData query, the CPN may be transmitted as a service key to obtain the line record information, i.e., zip code+4, associated with the CPN.

The LIDB may be used to store the zip codes associated with each telephone number because it generally contains all of the working telephone numbers in the service provider's service area and may include WTNs of contracted local independent local exchange carriers. It may be necessary to update the data base to include 9 digit zip codes for each associated WTN. The LIDB requires preferably at least Version 7.0 for the interfacing with the GetData command over the SS7. Further, Version 7.0 reorganizes the LIDB to include tag-value fields whose contents are defined by the client company.

In general, WTNs of the ILECs will not be contained within the service provider's LIDB because the service provider generally does not have access to information such as a customer's address. Thus, without the customer's address, the zip code cannot be determined. Accordingly, a default 9 digit zip code, e.g. 00000-0000, may be stored in the LIDB to send a zip code back to the ISCP even when the CPN originates from a caller of an ILEC. The same default 9 digit zip code may be used in the event that a service provider's customer's zip code cannot be found or assigned.

Referring again to FIG. 5, at step 312 the logic waits a predetermined time (e.g., between 1.0 and 3.0 seconds, at least in half second intervals) for the CPN-to-zip code translation to take place, before proceeding to step 314 to determine whether the GetData query was successful. That is, when the GetData query is launched, the SCP may begin a query timer to monitor the response time of the query to/response from the external database. A query time-out may be set (e.g., at 1.5 seconds) although an average query/response generally takes approximately 0.6 seconds. A second timer may be employed as a sampling timer to ensure that a specified amount of time has elapsed before checking the time-out timer, e.g., every 1.0 seconds. The second timer may work in whole second intervals.

If a query is found unsuccessful, e.g., time-out, query error, at step 311 the logic reports an applicable error message, i.e., a time-out condition, signaling connection control part (SCCP), or LIDB processing error, to the DRS. Time-out conditions may include: no response received and error notification received during the time-out interval. The query errors may include: routing error notification, e.g., signaling connection control part (SCCP) (the query did not make it to the LIDB), generally caused by global title translation failures, unequipped users, and network problems, and LIDB processing error notification, i.e., return of a return error message. After reporting the error, the logic at step 303 sends a response to the triggering CPR to route to the default number.

If the query is found successful at step 314, then step 316 the logic determines whether the CPN was listed in the external zip code database. If the CPN is not listed, the logic at step 313 reports to the DRS that the CPN was not in the LIDB and a response is then sent to the trigger CPR, at step 315, to route to the default number. If the CPN is listed, then at step 318, the logic determines whether the zip code+4 of the CPN was in the external zip code data base. If the zip code is not located, then at step 313 the logic reports to the DRS that the CPN is in the LIDB but not the zip code+4 and at step 315, a response message is sent to the trigger CPR to route to the default number.

If the zip code+4 is located, then at step 320, the zip code+4 is compared with the subscriber's predefined service area table to determine whether a routing number is found. If a routing number is found at step 322, then the logic proceeds to step 340. If, however, no routing number is ascertained, then the zip code+3 is compared, at step 324, with the subscriber's predefined service area table to determine whether a routing number is found in step 326. If a routing number is found at step 326, the logic proceeds to step 340. However, if no routing number is ascertained, then the zip code+2 is compared, at step 328, with the subscriber's predefined service area table to determine whether a routing number is found at step 330. If a routing number is found at step 330, the logic proceeds to step 340. When no routing number is ascertained at step 330, the zip code+1 is compared, at step 332, with the subscriber's predefined service area to determine whether a routing number is found at step 334. If a routing number is found at step 334, the logic proceeds to step 340. If no routing number is ascertained, then the zip code is compared, at step 336, with the subscriber's predefined service area to determine whether a routing number is found at step 338, as shown in FIG. 5.

The zip code information in the subscriber's predefined service area table may be fully compressed to conserve the ISCP's memory capacity. Because these zip codes are fully compressed, the single telephone number zip code routing service zip code processing CPR may need to perform 1 to 5 table look-ups to find a matching compressed zip code, i.e., a table look-up for each of zip code+4; zip code+3; etc. Accordingly, to optimize the table look-ups, the predefined service area table queries may be restricted to a minimum or maximum length zip code, e.g., predefined area and look-up search field restricted to zip code+2. This would eliminate unnecessary zip code look-ups and save processing time by the ISCP.

If no routing number is found that corresponds with the subscriber's predefined service area, the logic at step 319 reports that the zip code is not within the predefined service area to the DRS and, at step 321, sends a response message to the trigger CPR to route to the default number. If a routing number is found that corresponds with the subscriber's predefined service area table, the logic at step 340 reports to the DRS that the call was routed to the subscriber's location and, at step 342, sends a response message to the trigger CPR of the triggering SSP to route the offered call to the routing number.

Figure 7:
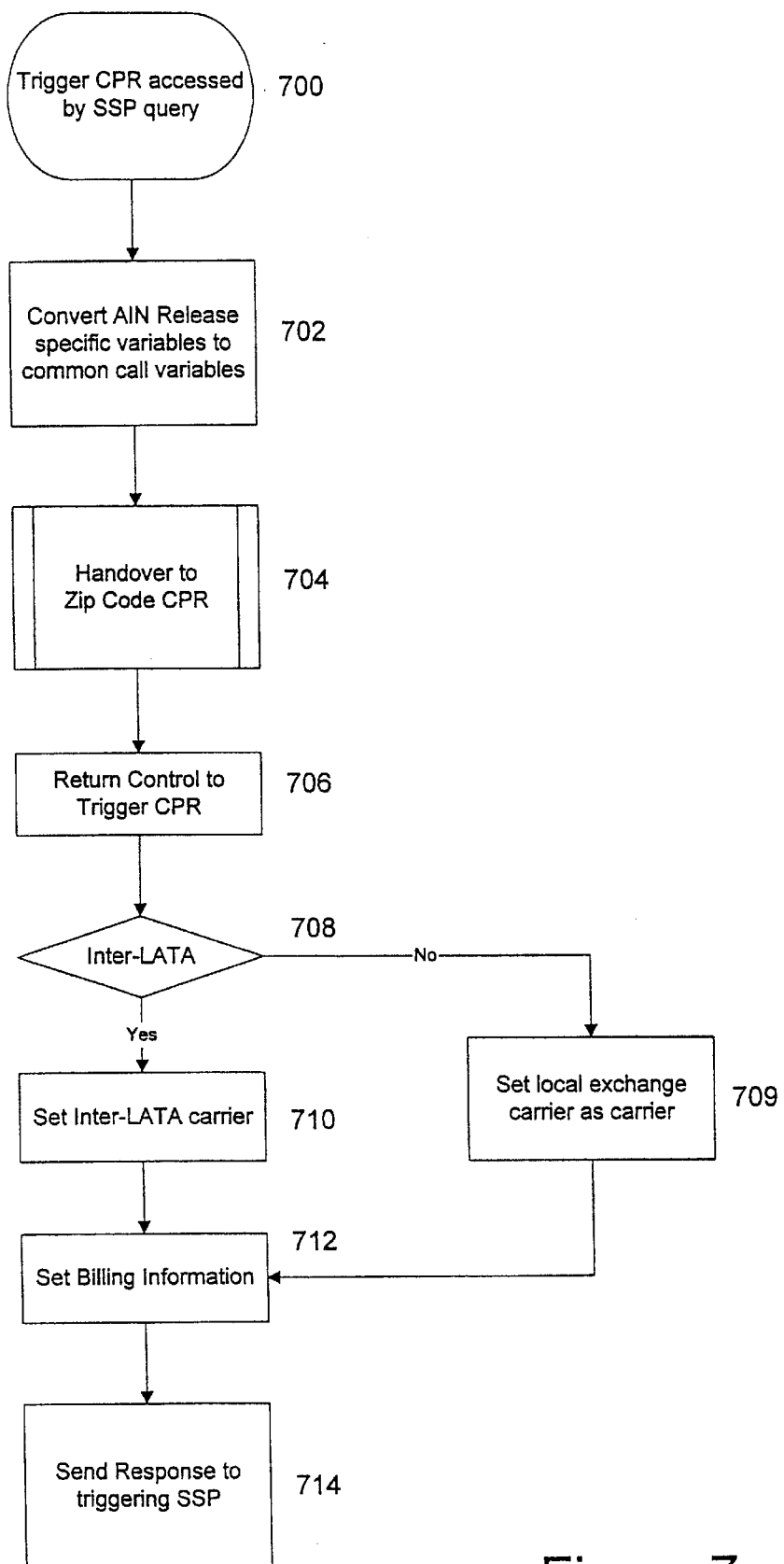
FIG. 7 shows an example of a flow diagram of a trigger CPR and logic flow for a single telephone number zip code routing service, according to the present invention.

An exemplary flow diagram of the trigger CPR is shown in FIG. 7. The trigger CPR may reside in the SCP of the ISCP. In step 700, the SSP is triggered by the single telephone number, and depending on the type of switch that is equipped as the SSP, the appropriate trigger CPR is accessed by the query launched by the SSP. In step 702, the AIN Release 0.0 or 0.1 query call variables are converted to common call variables by the trigger CPR logic for use by the ISCP. In step 704, the trigger CPR handsover control to the zip code CPR to determine the caller's zip code+4. When control is returned to the trigger CPR at step 706, the routing number is also transferred. The routing number may be one of the subscriber's satellite office closest to the caller's location or the subscriber's default telephone number.

The trigger CPR may determine whether the routing number is inter- or intra-LATA at step 708 by using a LATA table, such as that shown in FIG. 8. This table may maintained within the ISCP and may contain every NPA, NXX, and LATA for the service provider's service territory. The table may be created from a monthly file, e.g., terminating point master (TPM) generated by Bellcore. The LATA table may be used by the ISCP to determine whether the routing telephone number returned from the zip code CPR requires inter- or intra-LATA service, e.g., by comparing the LATA of the single number to the LATA of the routing telephone number. If the routing number requires inter-LATA routing, the inter-LATA carrier may be set at step 710, e.g., standard POTS procedures for generating interexchange carriers (IXC) originating access. If the routing number requires intra-LATA routing, a local exchange carrier (LEC) must be set as the call carrier at step 709. Since the subscriber to the single telephone number service will pay for the forwarding leg of the call, the subscriber must designate a carrier identification code (CIC) to be used in these cases. For example, the ISCP instructs the SSP to use a CIC of the single telephone number zip code routing subscriber, not the CIC of the originating number. At step 712, certain billing information may be set. According to an aspect of the invention, the originating caller may only be charged for the call origination to the triggering SSP. For charges accruing due to triggering the SSP and any subsequent routing, the charges may preferably be borne by the subscriber. At step 714, the routing number and any other necessary routing information are transferred to the triggering SSP through the ISCP response message over the SS7 or TCP/IP network.

Thus, according to general AIN principles and procedures, the routing number is passed to the triggering SSP. Call processing then resumes with the suspended call being connected to the routing number for termination.

As discussed above with respect to the zip code CPR, several possible errors may occur while the call is suspended and the triggering SSP is awaiting a response from the ISCP. These errors may be expected errors of the operating system of the ISCP and are indicative of both service and subscriber performance. Further, additional indications may be made if an error occurs due to a feature controlled and/or maintained by a participating ILEC. Thus, these errors may be quantified by, e.g., time, type, etc. and presented in a report for subscribers, customer service personnel, and participating ILECs.

By noting the type and/or time of a specified error, e.g., CPN not in LIDB, zip code not in LIDS, query error, etc., customer service personnel of the service provider may take corrective steps to avoid the error in the future. By monitoring whether certain queries directed to participating ILEC facilities are being received, properly processed, and/or responded to, the service provider can monitor the efficiency of the ILEC so as to better serve the subscriber.

Other error information, e.g., that a specified zip code was not found in the subscriber's predefined service area table, may be compiled and forwarded to the subscriber so that corrective action may be taken, such as adding certain zip codes to the predefined service area table. Further, all reports may be of interest to the subscriber so that an assessment may be made of the success of the single telephone number routing service campaign and of the quality of service furnished by the service provider.

As noted, the errors may be detected and recorded by the ISCP. The information detected and recorded may be forwarded to a service provider location for processing and compilation in a manner similar to the data transfer disclosed in commonly owned U.S. Patent Application No. 08/473,919, filed June 7, 1995, entitled "Apparatus and Method for Recording Call Related Data", the disclosure of which is incorporated herein by reference.

To accomplish service monitoring, the ISCP platform 30 may provide with the DRS with logic for selectively enabling a sampling node for collecting call data on each query from the SSP and logic for selectively enabling a measurement node for measuring occurrences of specified events or paths taken in the service logic flow.

The zip code CPR, as mentioned above, forwards certain error data to the DRS for use in creating the error reports.

When measurement or sampling nodes are active, all calls and call data will be tracked and stored on the DRS. Daily data may be selected from the DRS, and scripts may be provided to process and format the data and then transmit the data to a downstream processing database (not shown).

For example, customer performance reports may be generated. These reports may reflect a peg count of each error indication for each subscriber according to carrier, i.e., the service provider, ILEC, etc. Carrier service performance measurement reports may be generated. These reports may reflect a peg count for the service provider and each identified ILEC. Sampling data reports (according to CPNs not in external database or zip code not in external database) which may list the CPN, the single telephone number, call date, call time, zip code+4, and error encountered. Sampling data reports (according to no zip code in subscriber's predefined table) which may list the CPN, single telephone number, call date, call time, zip code+4, and error encountered.

The measurement node may be created 100% of the time for all subscribers and for all predetermined error types. A toggle feature may be programmed into the zip code CPR to allow the measurement node to be turned off/on should the subscriber later wish to enable the same. The sampling node may provide 100% call sampling of errors and also include a toggle feature.

The measurement and sampling data is an important sales tool because the subscriber can see how efficiently the single telephone number routing service is being maintained by the service provider. The supporting measurement data identifies whether the service provider or a participating ILEC is responsible for any necessary improvements. The sampling data enables the service provider and the participating ILECs to improve their external zip code databases, and enable the subscriber to improve the predefined service area. The end result is better service to the subscriber's customers and to the subscriber.

3. "Complex" Single Telephone Number Routine

Because of the single telephone number routing service according to the present invention uses both a trigger CPR and a universal zip code CPR, the simple single telephone number routing service may allow for certain added flexibility in service provisioning enabling additional customer defined call forwarding options. That is, service provisioning may allow certain defined exception periods to be "built-in" to the single telephone number routing service such that the zip code routing may be suspended in favor of at least one of, e.g., time-of-day, day-of-week, specific date, and/or percent allocation, simply by modifying the trigger CPR. These call forwarding methods may be implemented according to, e.g., the disclosure of commonly owned U.S. Application No. 08/455,024, filed May 31, 1995, entitled "Apparatus and Method for Forwarding Incoming Calls".

The trigger CPRs are stored and executed within the ISCP. This, enables.the trigger CPRs for the complex single number services, e.g., the exception periods, to take advantage of the internal ISCP clock for determining at least time-of-day, day-of-week, and the specific date of receiving the query from the SSP. When queries are launched to the ISCP, the ISCP notes the day, date and time, at least for billing purposes. The trigger CPRs for the complex single number service may also use this internal ISCP clock to determine whether a query is received during an exception period, the exception period defined within the trigger CPR, as more fully discussed hereinbelow.

Further, the exception periods may be defined before zip code routing, after zip code routing, or both. These services may be referred to as single number service (routing), customer location routing service, and single number/customer location routing service, respectively.

a. Single Number Service

Figure 9:
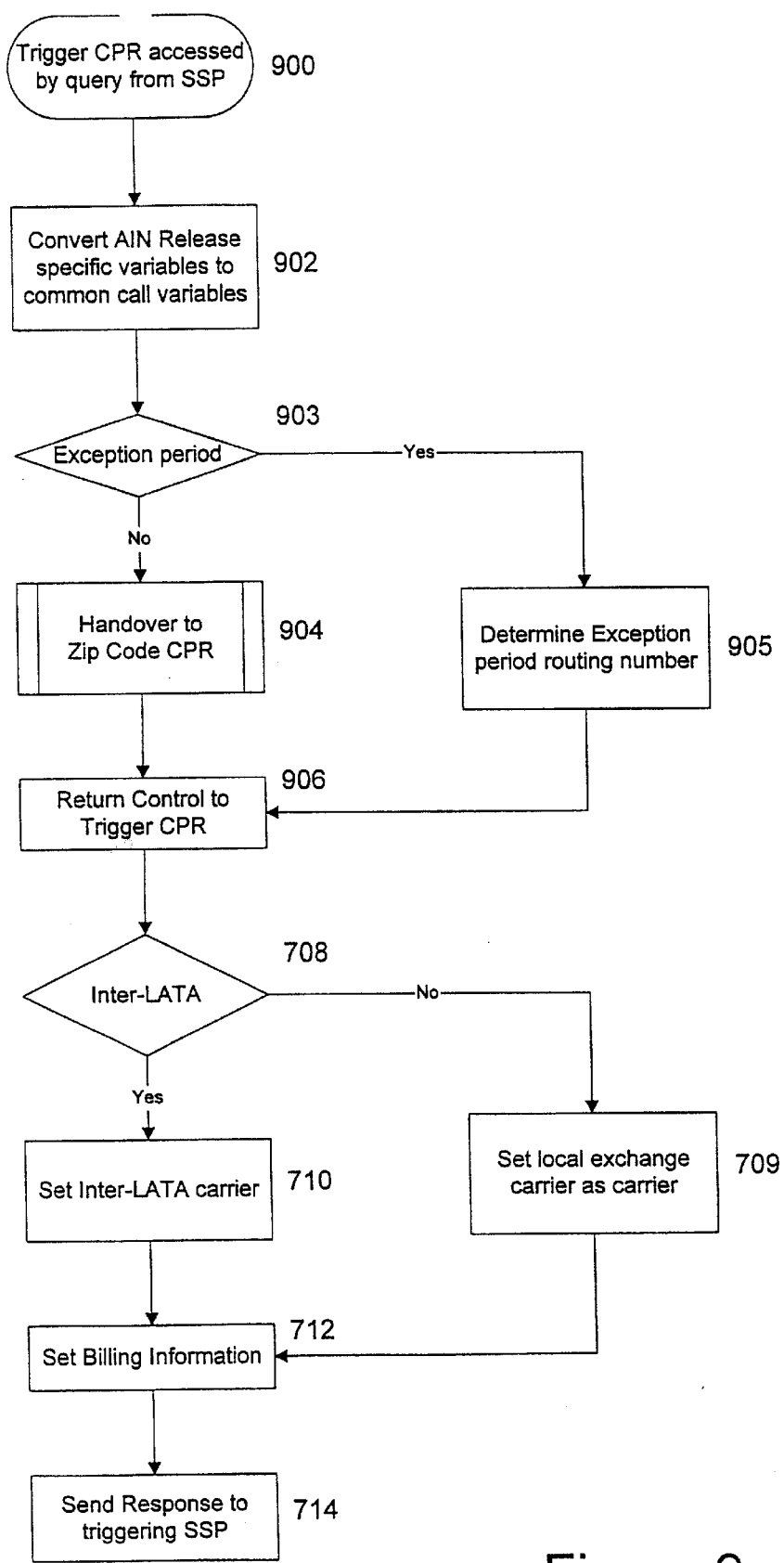
FIG. 9 shows an example of a flow diagram of a trigger CPR and logic flow for a single number service.

This complex service determines whether or not the subscriber desires to route the call according to the caller's geographic location, i.e., whether the trigger CPR should access the zip code CPR. FIG. 9 shows an example of the trigger CPR for the single number service, according to the present invention. Just as discussed above with respect to the single telephone number zip code routing service, each trigger may require a different trigger CPR, which may be nonetheless logically similar to each other.

This complex service defines exception periods and bypasses the zip code translation if the call originates during an exception period. These exception periods may be defined according to, e.g., date, time, day, or percent allocation. These exception periods may be predetermined by the business subscriber and stored in a database accessible by the ISCP.

Exception periods may be based upon a specific date. The subscriber may select, e.g., up to ten different dates per individual routing number, each date with a correspondingly defined routing telephone number. If a call is received on one of the exception period dates, the call may be routed according to a corresponding routing number or a percent allocation distribution. Calls received on non-exception period dates will be routed according to the geographic location of the originating caller.

If the subscriber wishes an exception period based upon day or time, the subscriber may define, e.g., a list or table of time-of-day/day-of-week entries, each listing with a correspondingly defined routing telephone number. The list preferably accounts for each-hour in a twenty-four hour period or each day of the week. The single telephone number routing service subscriber may select, e.g., up to ten different time-of-day/day-of-week entries. If calls are received during an exception period, then zip code routing in not performed and the call is routed according to the routing number in the time-of-day/day-of-week list or a percent allocation distribution. If calls are received during a non-exception period, then zip code routing is performed.

Besides simply routing a call to a defined routing number during an exception period defined by one of date, time, and day, the subscriber may alternatively select percentage allocation routing. The subscriber may select, e.g., 2 to 5 percentages, preferably whole number and preferably totalling 100%. The percent allocation feature does not limit the subscriber to only one routing location during an exception period. Percent allocation allows subscribers to distribute calls among several satellite office during an exception period. The ISCP includes a random allocation algorithm which may be implemented in providing the percent allocation feature.

Figure 10:
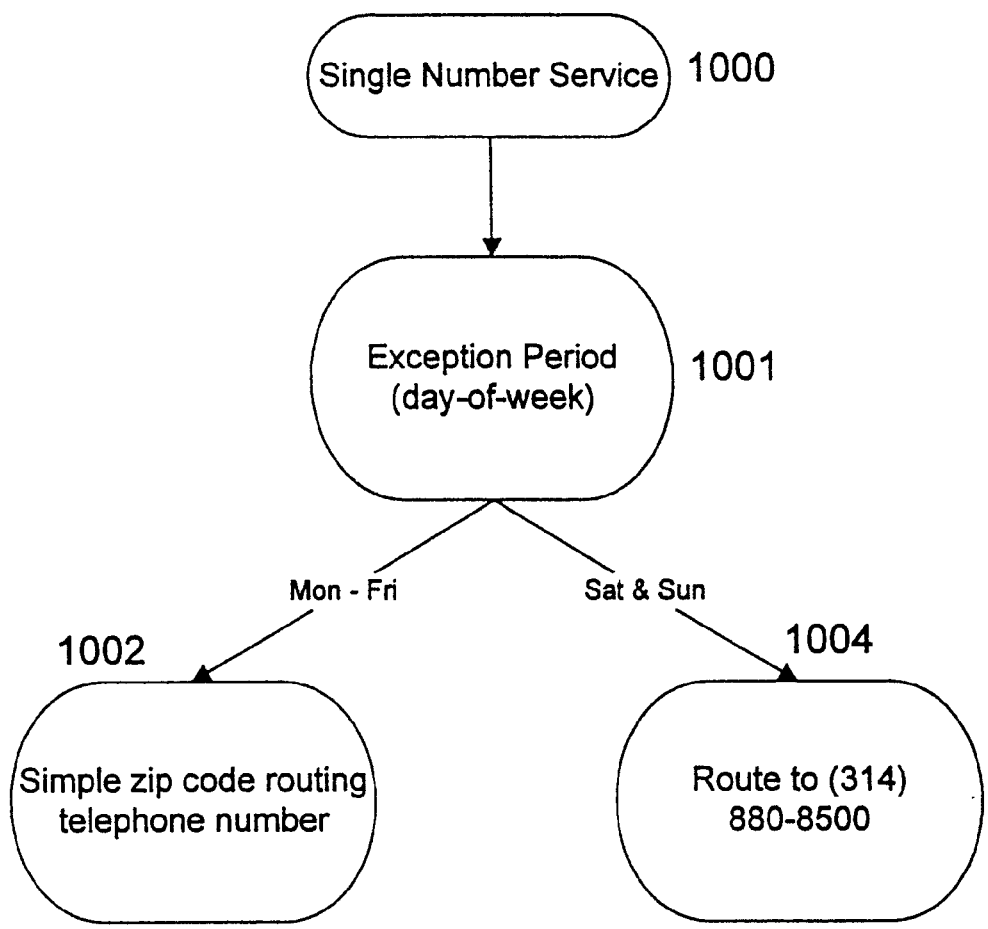
FIG. 10 shows an example of a single number service service, according to the present invention.

An exemplary scenario of a single number service is shown in FIG. 10. The single number service, a complex service, is represented by 1000. The exception period 1001 is, e.g., a day-of-week exception period in which on Saturday and Sunday the originating caller will be routed, at 1004, to (314) 880-8500. Monday–Friday are not designated as exception periods, thus, on those days, simple zip code routing 1002 of the originating call is performed.

An exemplary flow diagram of the trigger CPR is shown in FIG. 9. At step 900, the SSP is triggered by the single telephone number, and depending on the type of switch used as the triggering SSP, the appropriate trigger CPR is accessed by the SCP from the query launched from the SSP. At step 902, the AIN Release 0.0 or 0.1 query call variables are converted to common call variables by the trigger CPR for use by the ISCP. At step 903, it is determined whether the current call has been offered during a defined exception period. Assume that the call is placed during an exception period, e.g., Saturday. The trigger CPR will perform the defined call forwarding technique at step 905 and then return routing number (314) 880-8500 to the trigger CPR at step 906. Assume that the call is placed during a non-exception period, e.g., Tuesday. Control is handed over to the zip-code CPR at step 904 for processing as discussed above in the single telephone number zip code routing service. The remaining trigger CPR steps 708–714 are identical to those discussed above.

It is noted that the selected manner of forwarding by the subscriber is not limited to a single service. That is, any combination of the day-of-week, time-of-day, and specific date exception periods may be combined with a customer defined single number routing service.

b. Customer Location Routing

Figure 11:
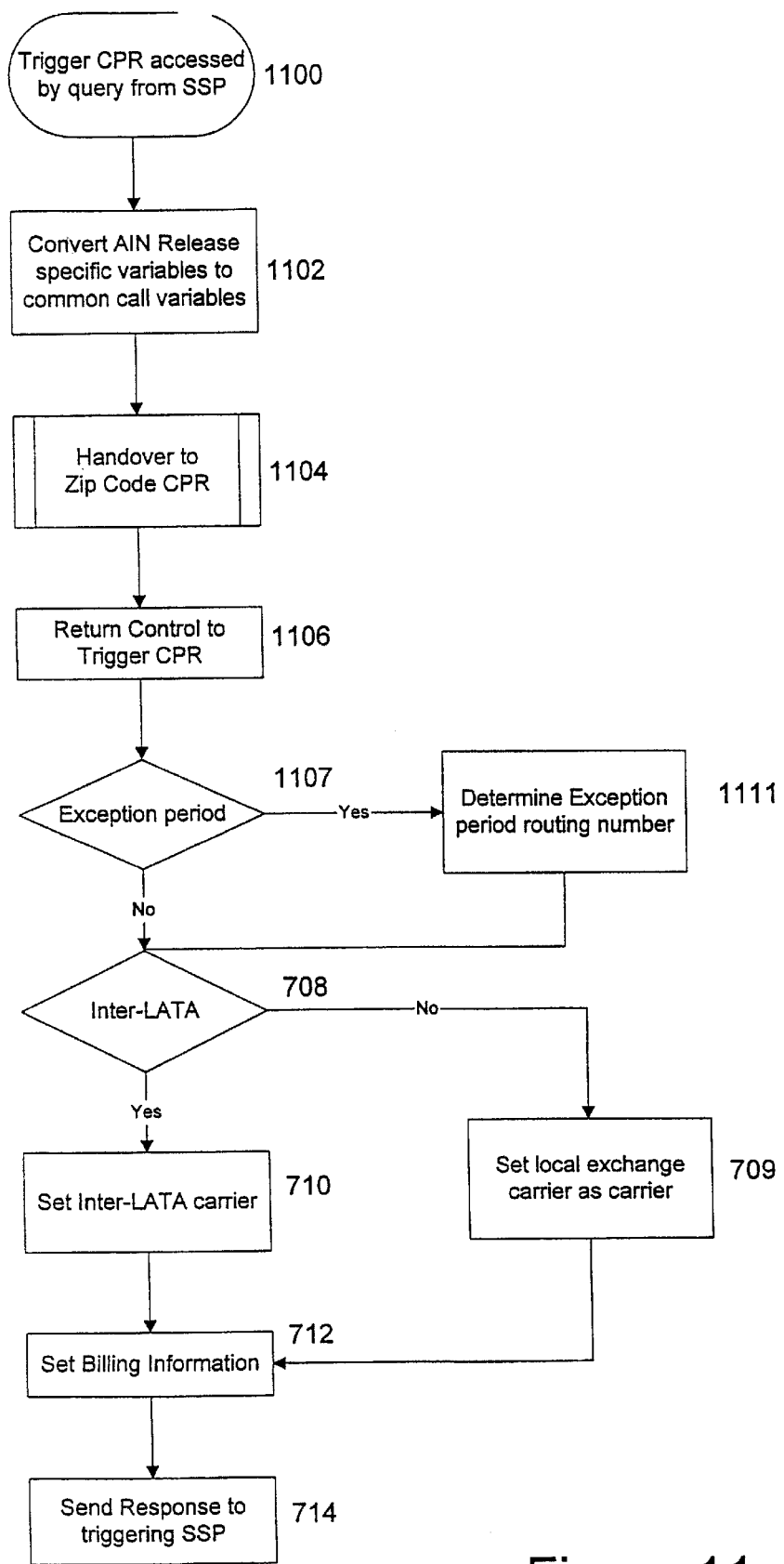
FIG. 11 shows an example of a flow diagram of a trigger CPR for a customer location routing service of the present invention.

This service, like the single number service, determines whether or not the subscriber desires to route the call according to the caller's geographic location or according to some other routing option. However, the customer location routing service determines whether to route according to the caller's geographic location after the zip code+4 translation has occurred. FIG. 11 shows an example of the trigger CPR for the customer location routing service. Just as discussed above with respect to the single telephone number zip code routing service, each trigger may require a different trigger, which may be nonetheless logically similar to each other.

This complex service defines exception periods and determines whether a call routed to an individual subscriber's location requires additional routing. These exception periods may be defined according to, e.g., date, time, or day.

Exception periods may be based upon a specific date that a call is routed to a particular subscriber satellite location. For each single telephone number routing service call, the CPN-to-zip code translation is performed, then the subscriber defined routing number is forwarded to the trigger CPR. The single telephone number routing service subscriber may select, e.g., up to ten different dates per each routing number, each date with a correspondingly defined final routing telephone number. If a call is received on one of the exception period dates, the call may be routed according to a corresponding final routing number or a percent allocation distribution. Calls received on non-exception period dates may be routed according to the geographic location of the originating caller.

If the subscriber wishes an exception period based upon day or time, the subscriber may define, e.g., a list of time-of-day/day-of-week entries for each subscriber satellite office, each listing with a correspondingly defined routing telephone number. The list preferably accounts for each hour in a twenty-four hour period or each day of the week. The single telephone number routing service subscriber may select, e.g., up to ten different time-of-day/day-of-week entries for each subscriber's office. If calls are received during an exception period, then the call is rerouted to the final routing number defined in the time-of-day/day-of-week list or a percent allocation distribution. If calls are received during a non-exception period, then routing to the subscriber office telephone number determined during zip code routing is performed.

Besides simply routing a call to a defined routing number during an exception period defined by one of date time, and day, the subscriber may alternatively select percentage allocation routing. The subscriber may select, e.g., 2 to 5 percentages, preferably whole number and preferably totalling 100%. The percent allocation feature does not limit the subscriber to only one routing location during an exception period. Percent allocation allows subscribers to distribute calls among several satellite office during an exception period. The ISCP includes a random allocation algorithm which may be implemented in providing the percent allocation feature.

The flow diagram of the customer location routing service, shown in FIG. 11, may be the same as the single telephone number zip code routing service until control and the routing number are handed over to the trigger CPR with the routing telephone number at step 1106. As discussed above, the routing number may be one of the subscriber's satellite office closest to the caller's location and the subscriber's default telephone number.

Figure 12:
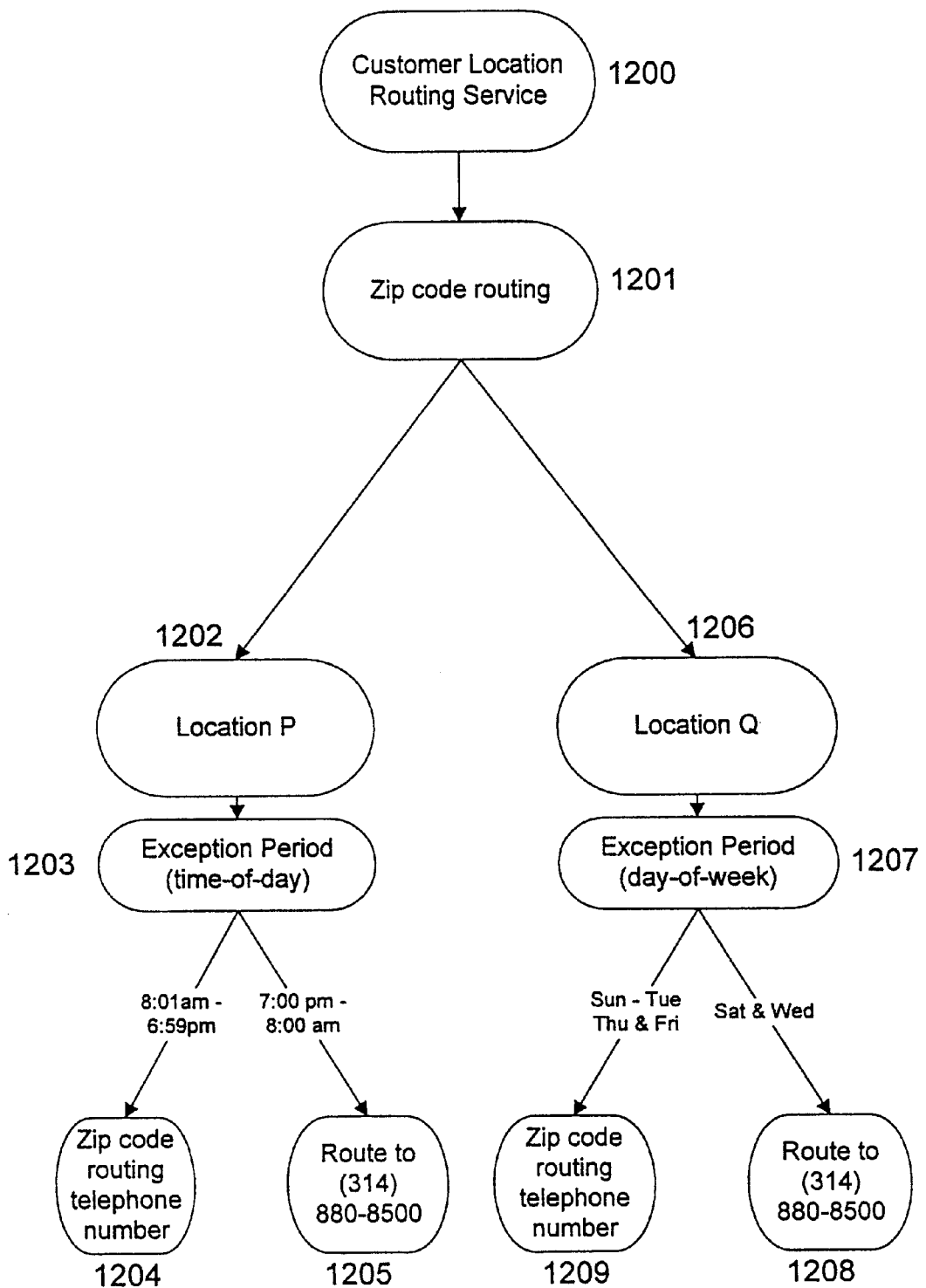
FIG. 12 shows an example of a customer location routing service service.

An exemplary scenario of a customer location routing service 1200 is shown in FIG. 12. After the zip code routing of the originating call has occurred at 1201, it is determined whether the originating call is being routed to a location during an exception period. Assuming that the possible locations for zip code routing are location P 1202 and location Q 1206, that location P includes a time-of-day exception period, and that location Q includes a day-of-week exception period. Location P, between 7:00 pm and 8:00 am, will route all calls to an alternate (or final) routing number 1205, e.g., (314) 880-8500 and, between 8:01 am and 6:59 pm, will route all calls to the telephone number determined during simple zip code routing 1204. Location Q, on Saturday and Wednesday, will route all calls to an alternate routing number 1208, e.g., (314) 880-8500 and, on Sunday–Tuesday, Thursday, and Friday, will route all calls by simple zip code routing 1209.

After the zip code CPR hands over the routing number at step 1106, e.g., the routing number for Location P, it is determined at step 1107 whether the current call has been offered during a defined exception period. Assuming that the originating call is placed during an exception period, e.g., 11:30 pm, the trigger CPR will perform the defined call forwarding technique, e.g., replace the zip code CPR routing number with the final routing number, at step 1111, and the logic forwards the routing number to step 708. Assuming that the originating call is place during a non-exception period, e.g., 2:00 pm, the routing number the zip code CPR may be forwarded by the logic at step 708. The remaining steps in the trigger CPR are identical to those discussed above.

Alternatively, if the routing number for Location Q was handed over from the zip code routing at step 1106, it would be necessary to determine whether the originating call was placed during an exception period defined for Location Q 1107, e.g., Saturday and Wednesday.

Once again, it is noted that the selected manner of forwarding by the subscriber is not limited to a single service. That is, any combination of the day-of-week, time-of-day, and specific date exception periods may be combined with a customer defined customer location routing service.

c. Single Number/Customer Location Routing

Figure 13:
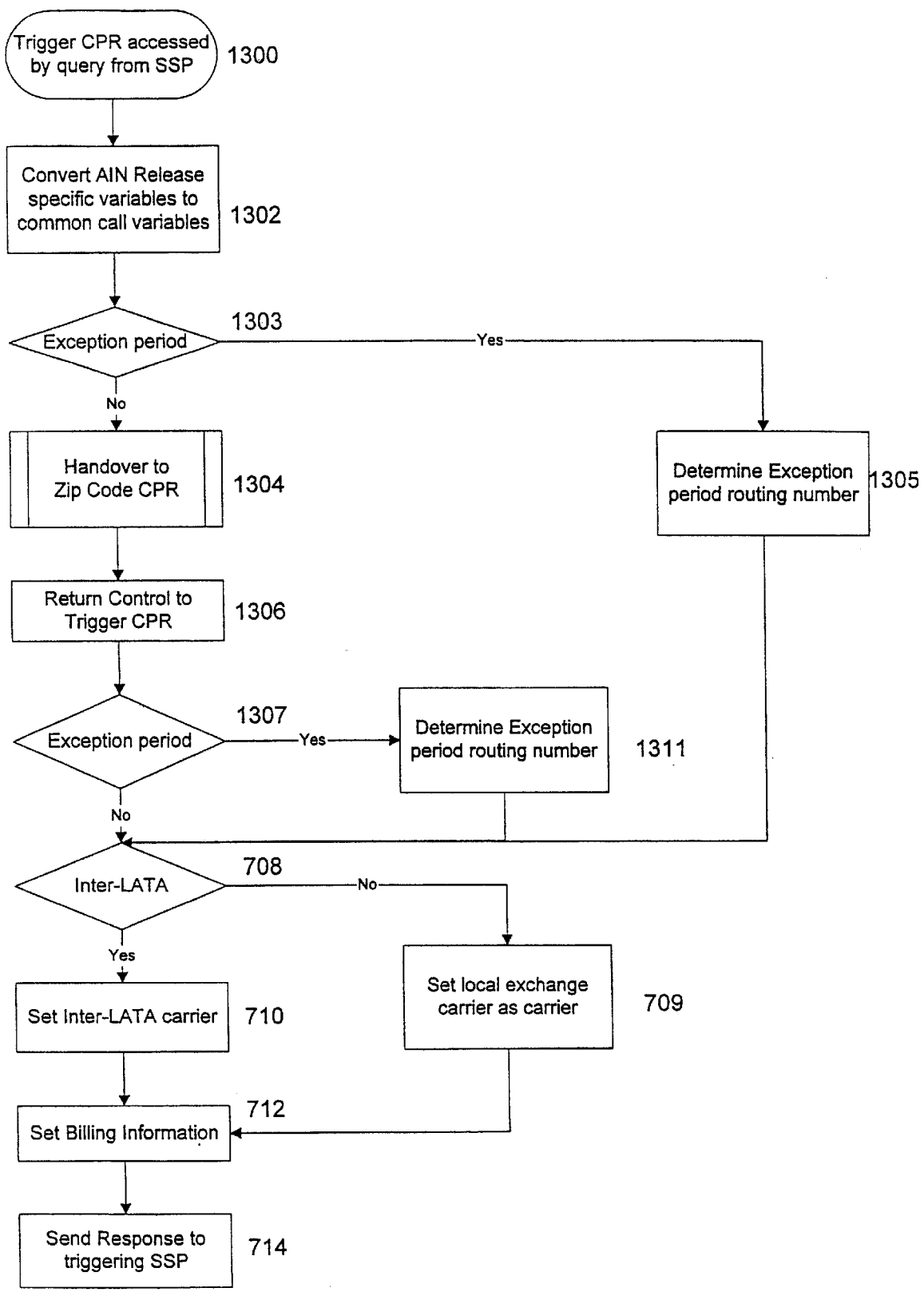
FIG. 13 shows an example of a flow diagram of a trigger CPR and logic flow for a single number/customer location routing service.

This service, like other exception period services discussed above, determines whether or not the offered call should be routed solely according to the caller's geographic location. This service is a combination of the single number service and the customer location routing. In other words, the zip code +4 translation may be bypassed during certain defined exception periods and, during other defined exception periods, the closest location routing number may be replaced with a final routing number. FIG. 13 shows an example of the trigger CPR for the single number/customer location routing service. Again, each trigger may require a different trigger, which may be nonetheless logically similar to each other.

Figure 14:
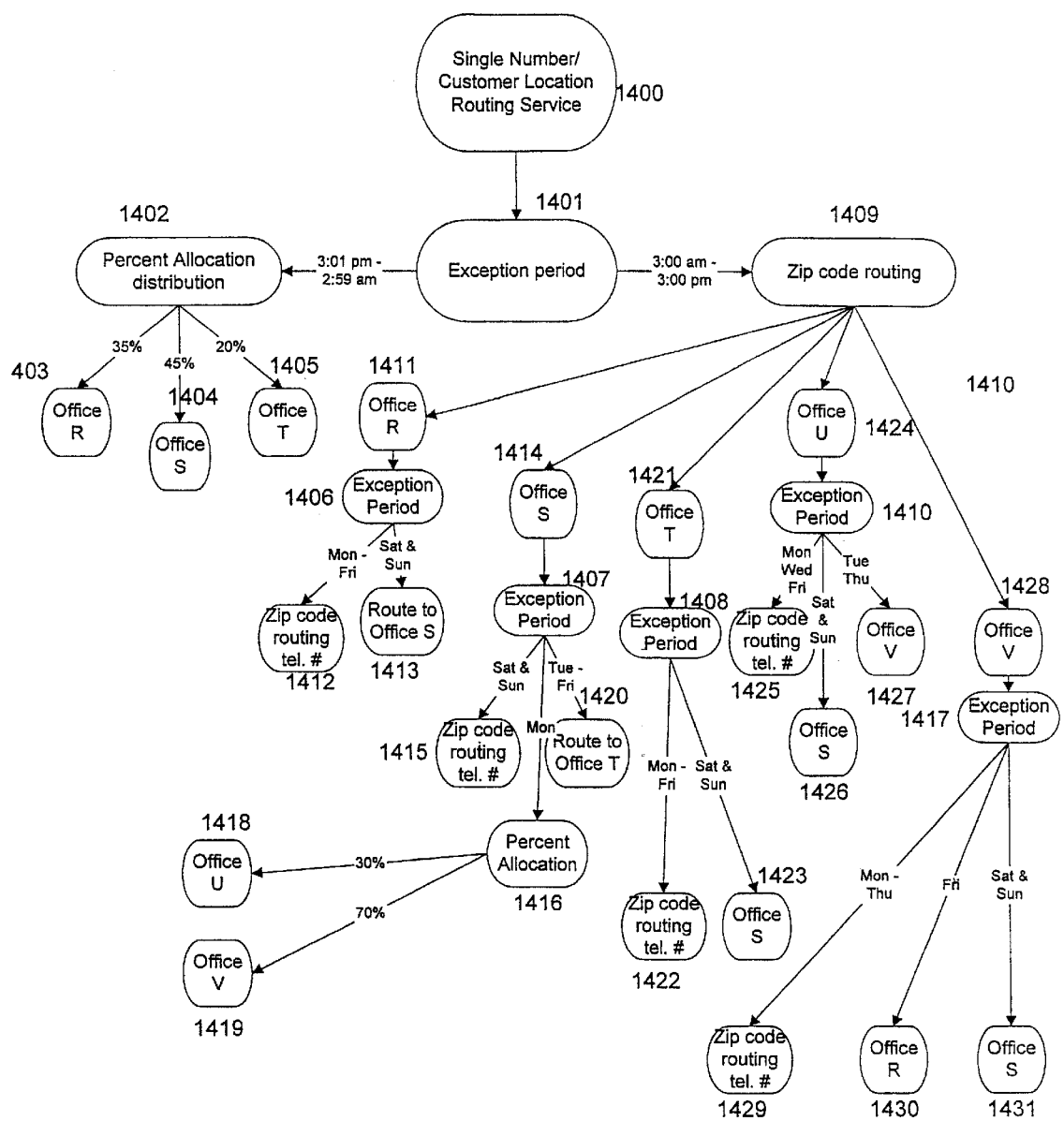
FIG. 14 shows an example of a single number/customer location routing service service, according to the present invention.
Figure 15:
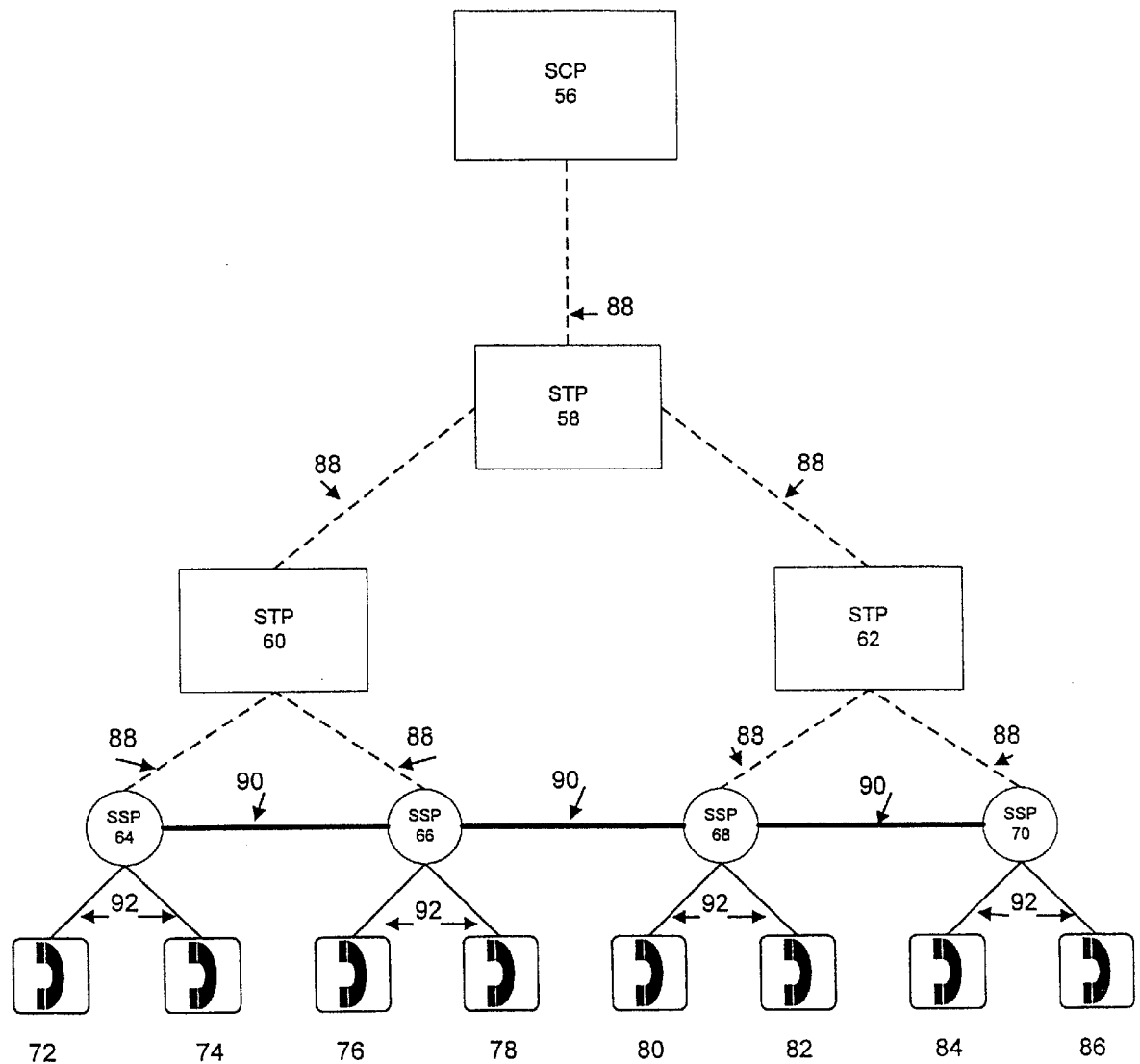
FIG. 15 shows an AIN system, according to the prior art.

For example, assume the scenario in FIG. 14. A single number service 1400 time-of-day exception period 1401 is defined in which between 3:01 pm and 2:59 am calls are allocated between satellite location R, S, and T at 35%, 45%, and 20%, respectively. Otherwise, calls are routed according to the zip code CPR routing number 1409. Further day-of-week exception codes are defined for each satellite location R, S, T, U, and V at 1406, 1407, 1408, 1410, and 1417, respectively. Specifically, satellite location R 1411 has no exception logic on Monday through Friday 1412, but is final routed to satellite location S on Saturday and Sunday 1413; satellite location S has no exception logic on Saturday and Sunday 1415, is alternate routed to satellite location T on Tuesday through Friday 1420, and allocated 1416 on Monday between satellite location U. (30%) 1418 and satellite location V (70%) 1419; satellite location T has no exception on Monday through Friday 1422, and is final routed to satellite location S on Saturday and Sunday 1423; satellite location U has no exception on Monday, Wednesday and Friday 1425, is alternate routed to satellite location S on Saturday and Sunday 1426, and is alternate routed to satellite location v on Tuesday and Thursday 1427; and satellite location V has no exception on Monday through Thursday 1429, is final routed to satellite location R on Friday 1430, and is final routed to satellite location S on Saturday and Sunday 1431.

In step 1300 of FIG. 13, the SSP is triggered by the single telephone number. At step 1302, the AIN Release 0.0 or 0.1 query call variables are converted to common call variables for use by the ISCP. At step 1303, it is determined whether the current call has been offered during a defined exception period. If during an exception period, e.g., the call is placed at 4:00 pm, the call will be percent allocated between satellite locations R, S, and T, and the routing number will be forwarded to the trigger CPR at step 708. If not during an exception period, e.g., the call is placed at 10:00 am, control is handed over to the zip code CPR at step 1304 for processing as discussed above in the single telephone number zip code routing service.

After control and the routing number are handed over to the trigger CPR, at step 1306, the logic at, step 1307, determines whether the specific routing number is within an exception period.

Assuming, e.g., that satellite location S was returned at step 1306 as the closest satellite office of the subscriber and that it is Saturday, no exception period is recognized at step 1307 and satellite location S is passed as the routing number at step 1308. Assuming, e.g., that satellite location S was returned to step 1306 on a Wednesday, step 1307 recognizes the exception period and step 1311 determines that satellite location T should be returned as the routing number at step 708. The remaining steps in the trigger CPR are identical to those discussed above.

Thus, the subscriber may individually define and, therefore, fine tune a service area to satisfy the various requirements of the patrons of its satellite offices within an intended service area. As shown above, when several satellite offices are within the same local telephone service area, the single telephone number service may be defined such that certain offices are not forwarded calls during times in which the office is closed.

It is noted that the foregoing examples have been provided merely for the purpose of explanation and are in no way to be construed as limiting of the present invention. While the invention has been described with reference to a s preferred embodiment, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method for routing an originating call to one of a plurality of subscriber locations within a telecommunications network, the method comprising:

ascertaining a geographic location of a calling party in accordance with an originating telephone number of the calling party; and determining, within a service control point, which of the plurality of subscriber locations serves the geographic location of the calling party, the determining including comparing the ascertained geographic location with at least one predefined subscriber service area, the comparing comprising first comparing the ascertained geographic location to a first predefined subscriber service area and, if no match is found, comparing the ascertained geographic location to a second expanded predefined subscriber service area, wherein, when no matches are found the call request is forwarded to a predetermined default routing telephone number;

wherein, when a match is found, the call request is forwarded to a routing telephone number associated with the matched predefined subscriber service area.

2. The method according to claim 1, wherein geographic locations within the first and second predefined subscriber service areas are correlated with a predefined terminating number of one of the plurality of subscriber locations.

3. The method according to claim 1, the ascertaining further comprising:

querying a database external to the service control point that includes a list of service provider customer identifying information and corresponding customer geographic information.

4. An apparatus for routing an originating call to a subscriber location within a telecommunications network, the apparatus comprising:

a service control point that ascertains a geographic location of a calling party in accordance with an originating telephone number of the calling party and that recognizes at least one exception period, which correspond to at least one alternate routing telephone number, before ascertaining the geographic location of the calling party;

a service switching point that forwards the call request to one of the at least one alternate routing telephone numbers when the service control point recognizes the at least one exception period;

wherein the service control point determines which of the plurality of subscriber locations serves the geographic location of the calling party when outside the at least one exception period.

5. The apparatus according to claim 4, in which the service control point further comprises:
a receiver that receives identifying information from a calling device; and
a translator that translates the identifying information into a geographic designation of call origination.

6. The apparatus according to claim 4, wherein the service control point limits incoming calls to the subscriber location to calls originating within a predefined geographic area.

7. The apparatus according to claim 4, the service control point including:
a comparator that compares the ascertained geographic location of the caller with at least one predetermined set of geographic designations corresponding to at least one subscriber service area, the predetermined set of geographic designations being stored within the service control point.

8. The apparatus according to claim 4, in which the service control point further comprises:
a query generator that queries a database external to the service control point that includes a list of service provider customer identification information and corresponding customer geographic information.

9. The apparatus according to claim 8, the external database comprising a line information database.

10. The apparatus according to claim 9, in which the line information further comprises:
a receiver that receives service provider customer billing information for each associated customer telephone number;
an extraction apparatus that strips off post office zip code+4 designations for each customer; and
a storage apparatus that stores at least one of zip code+0, zip code+1, zip code+2, zip code+3 and zip code+4 designations.

11. An apparatus for routing an originating call to one of a plurality of subscriber locations within a telecommunications network, the apparatus comprising:
a service control point that ascertains a geographic location of a calling party in accordance with an originating telephone number of the calling party; and that determines which of the plurality of subscriber locations serves the geographic location of the calling party by comparing the ascertained geographic location with at least one predefined subscriber service area, the comparing comprising first comparing the ascertained geographic location to a first predefined subscriber service area and, if no match is found, comparing the ascertained geographic location to a second expanded predefined subscriber service area, and
a service switching point that forwards the call request to a predetermined default routing telephone number when no matches are found and that forwards the call request to a routing telephone number associated with the matched predefined subscriber service area when a match is found.

12. The apparatus according to claim 11, wherein geographic locations within the first and second predefined subscriber service areas are correlated with a predefined terminating number of one of the plurality of subscriber locations.

13. The apparatus according to claim 11, further comprising:
a database external to the service control point that includes a list of service provider customer identifying information and corresponding customer geographic information and that is queried by the service control point.

14. A computer readable medium storing a computer program that routes an originating call to one of a plurality of subscriber locations within a telecommunications network by:
ascertaining a geographic location of a calling party in accordance with an originating telephone number of the calling party; and
determining which of the plurality of subscriber locations serves the geographic location of the calling party by comparing the ascertained geographic location with at least one predefined subscriber service area, the comparing comprising first comparing the ascertained geographic location to a first predefined subscriber service area and, if no match is found, comparing the ascertained geographic location to a second expanded predefined subscriber service area,
wherein, when no matches are found the call request is forwarded to a predetermined default routing telephone number; and
wherein, when a match is found, the call request is forwarded to a routing telephone number associated with the matched predefined subscriber service area.

15. The computer readable medium according to claim 14, wherein geographic locations within the first and second predefined subscriber service areas are correlated with a predefined terminating number of one of the plurality of subscriber locations.

16. The computer readable medium according to claim 14, the ascertaining further comprising: querying an external database that includes a list of service provider customer identifying information and corresponding customer geographic information.

17. The method according to claim 1, wherein the plurality of subscriber locations are each contacted by call requests using a single telephone number.

18. The method according to claim 1, wherein each of the first and second predefined subscriber service areas define a market area of the subscriber served by one of the plurality of subscriber locations.

19. The method according to claim 1, wherein each of the first and second predefined subscriber service areas correspond to one of a zip code+0, a zip code+1, a zip code+2, a zip code+2, or a zip code+4.

20. The method according to claim 17, further comprising:
identifying a subscriber's service logic based on the call request from the calling party.

* * * * *

UNITED STATES PATENT AND TRADEMARK OFFICE
CERTIFICATE OF CORRECTION

PATENT NO. : 6,542,598 B2
DATED : April 1, 2003
INVENTOR(S) : H. Fleischer, III et al.

It is certified that error appears in the above-identified patent and that said Letters Patent is hereby corrected as shown below:

Column 32,
Line 54, "code+2" (second occurrence) should be -- code+3 --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,542,598 B2  
DATED : April 1, 2003  
INVENTOR(S) : H. Fleischer, III et al.

It is certified that error appears in the above-identified patent and that said Letters Patent is hereby corrected as shown below:

Title page,  
Item [56], References Cited, the following U.S. PATENT DOCUMENTS should be included:

| | | | |
|---|---|---|---|
| -- 5,572,579 | 11/05/96 | Orriss et al. | 379/142.01 |
| 4,191,860 | 03/04/80 | Weber | 379/115.01 |
| 4,757,267 | 07/12/88 | Riskin | 379/114.24 |
| 4,611,094 | 09/09/86 | Asmuth et al. | 379/201.03 |
| 4,611,096 | 09/09/86 | Asmuth et al. | 379/201.02 |
| 4,788,718 | 12/29/88 | McNabb | 379/112.08 |
| 5,247,571 | 09/21/93 | Kay et al. | 379/221.09 |
| 5,353,331 | 10/04/94 | Emery | 379/221.08x -- |

OTHER PUBLICATIONS, the following should be included:
-- Berman, Roger K., and Brewster, John H., Perspectives on the "AIN Architecture," IEEE Communication Magazine, February 1992, pp. 27-32.
    Generic Requirements for GetData (Bellcore OR 2838-CORE).

"ISDN Call Forwarding," Bell Communications Research, Technical Reference TR-TSY-000853. Issue 1 (December 1998).

"ISDN Call Forwarding, Revision 1," Bell Communications Research, Technical Reference TR-TSY-00853 Revision 1 (December 1993). --

Column 32,  
Line 54, "code+2" (second occurrence) should be -- code+3 --.

Signed and Sealed this

Ninth Day of March, 2004

JON W. DUDAS  
*Acting Director of the United States Patent and Trademark Office*